US012578773B2

(12) United States Patent
Carlson et al.

(10) Patent No.: US 12,578,773 B2
(45) Date of Patent: Mar. 17, 2026

(54) SYSTEMS AND METHODS FOR SCIENTIFIC INSTRUMENT UTILIZATION TRACKING

(71) Applicant: Thermo Electron Scientific Instruments LLC, Madison, WI (US)

(72) Inventors: Stephen Carlson, Houston, TX (US); Antoine Uzzeni, Escondido, CA (US); Elizabeth Harchick, Del Mar, CA (US); Christopher Barnard, Rushden (GB); Landon Vaughn, La Jolla, CA (US); Andrew Lechner, Houston, TX (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 109 days.

(21) Appl. No.: 18/322,030

(22) Filed: May 23, 2023

(65) Prior Publication Data

US 2024/0393855 A1 Nov. 28, 2024

(51) Int. Cl.
*G06F 1/28* (2006.01)

(52) U.S. Cl.
CPC ..................................... *G06F 1/28* (2013.01)

(58) Field of Classification Search
None
See application file for complete search history.

(56) References Cited

U.S. PATENT DOCUMENTS

| | | | | |
|---|---|---|---|---|
| 9,898,067 | B2 * | 2/2018 | Distefano | G06F 1/3234 |
| 11,797,821 | B2 * | 10/2023 | Cella | H04W 4/35 |
| 2010/0328314 | A1 * | 12/2010 | Ellingham | G06Q 50/06 463/31 |
| 2010/0332043 | A1 * | 12/2010 | Weyland | G06F 1/3203 700/291 |
| 2011/0230327 | A1 * | 9/2011 | Takahashi | B04B 13/00 494/10 |
| 2015/0039922 | A1 * | 2/2015 | Chalhoub | G06F 1/3296 713/323 |
| 2019/0018378 | A1 * | 1/2019 | Varikooty | G05B 19/042 |
| 2020/0143216 | A1 * | 5/2020 | Sugar | G16H 40/20 |

* cited by examiner

*Primary Examiner* — Danny Chan
(74) *Attorney, Agent, or Firm* — Gareth Blyth

(57) ABSTRACT

Disclosed herein are scientific instrument utilization tracking systems, as well as related methods, computing devices, and computer-readable media. For example, in some embodiments, a method of tracking utilization of a scientific instrument may include: receiving, at a computing system, first data from a power sensor associated with the scientific instrument, wherein the power sensor monitors power consumption by the scientific instrument; generating, by the computing system based on the first data, multiple power consumption ranges associated with corresponding operational states of the scientific instrument; receiving, at the computing system, second data from the power sensor associated with the scientific instrument; and outputting, by the computing system, indications of the operational states over time of the scientific instrument based on the second data and the power consumption ranges.

20 Claims, 16 Drawing Sheets

2400

Receive power consumption data for a scientific instrument
2402

Compare received power consumption data to operational state power consumption thresholds to identify an operational state associated with the scientific instrument
2404

Provide the operational state to one or more computing devices
2406

2000

2100

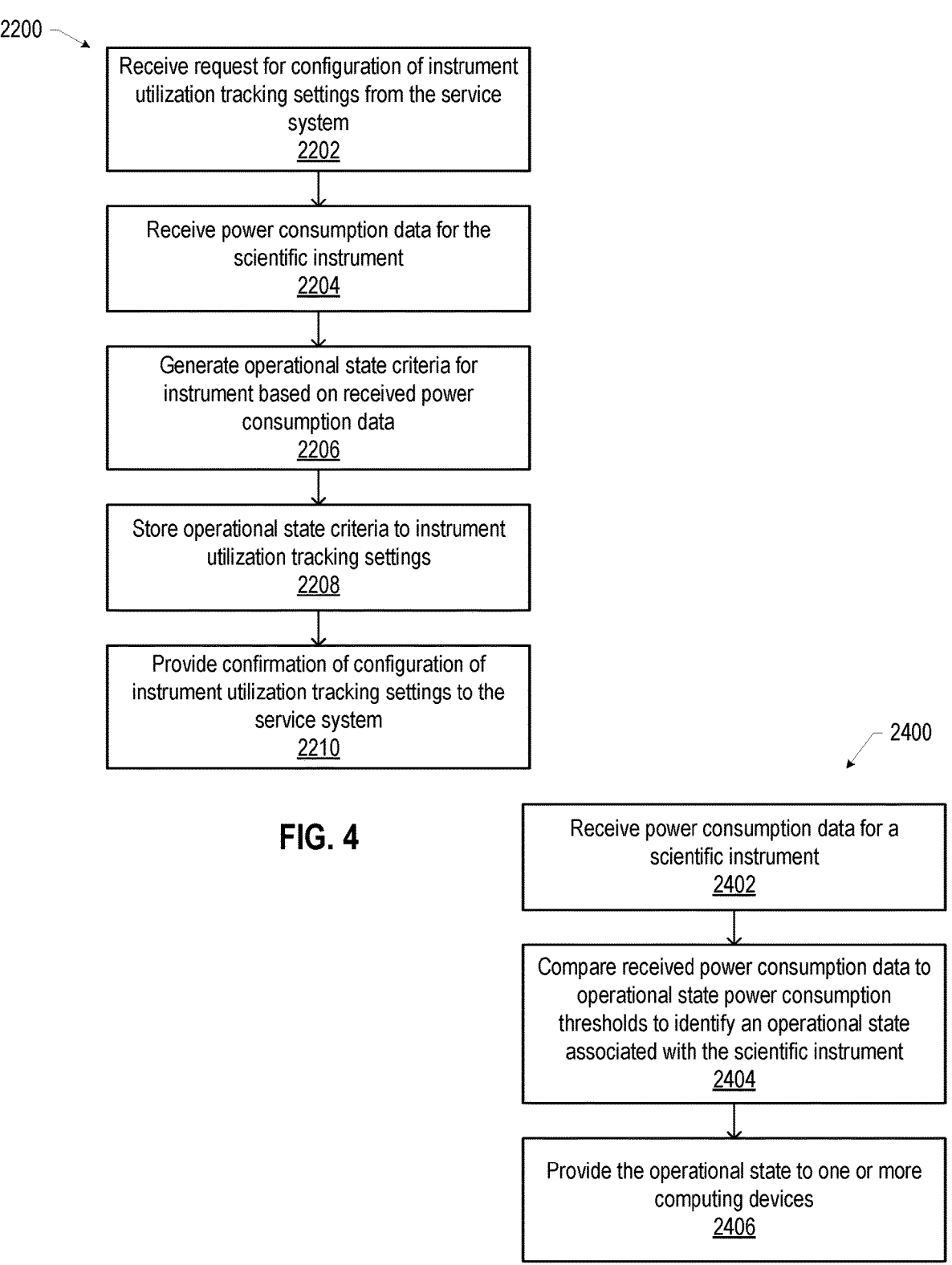

2200

Receive request for configuration of instrument utilization tracking settings from the service system
2202

Receive power consumption data for the scientific instrument
2204

Generate operational state criteria for instrument based on received power consumption data
2206

Store operational state criteria to instrument utilization tracking settings
2208

Provide confirmation of configuration of instrument utilization tracking settings to the service system
2210

Receive power consumption data for a scientific instrument
2402

Compare received power consumption data to operational state power consumption thresholds to identify an operational state associated with the scientific instrument
2404

Provide the operational state to one or more computing devices
2406

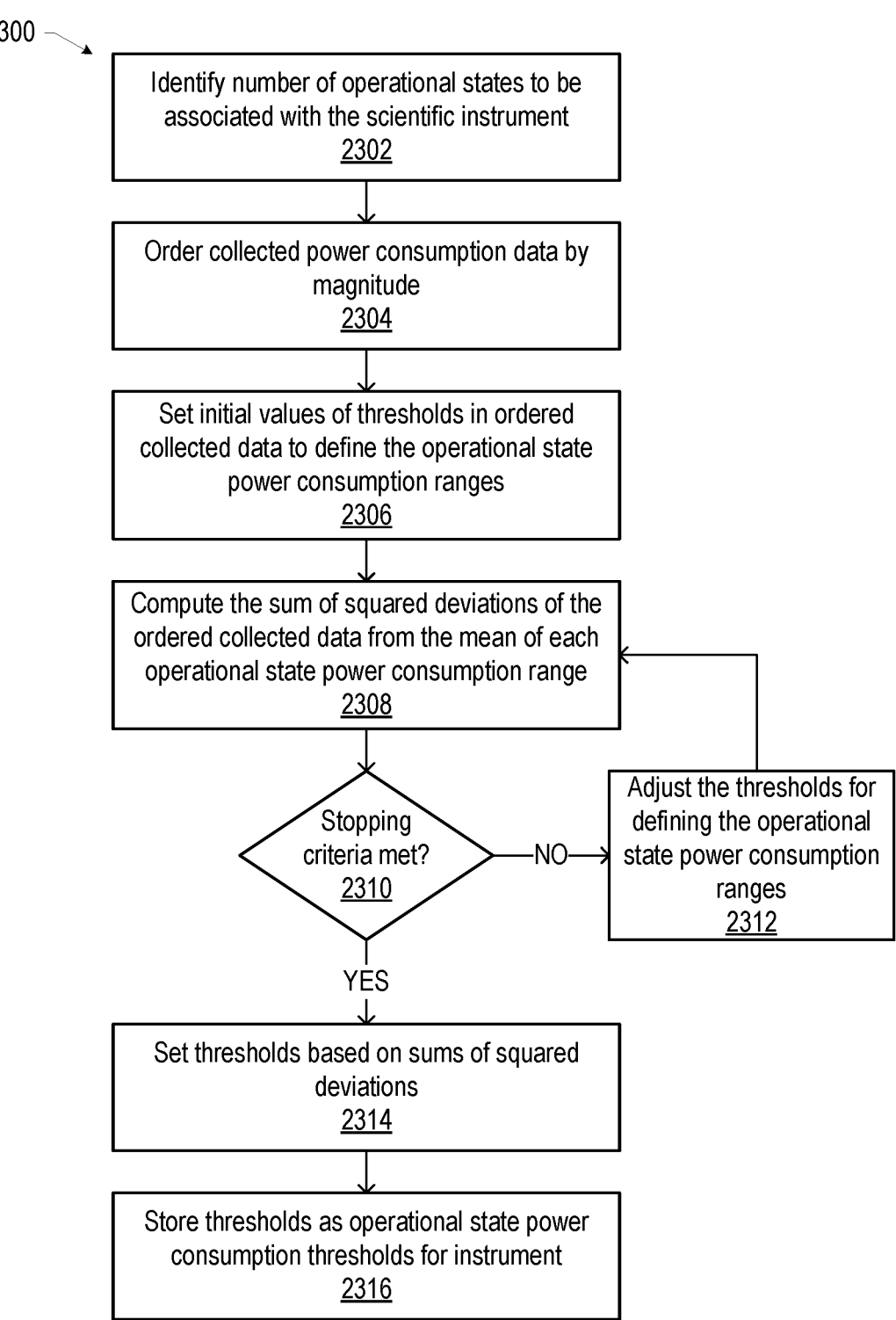

Identify number of operational states to be
associated with the scientific instrument
2302

Order collected power consumption data by
magnitude
2304

Set initial values of thresholds in ordered
collected data to define the operational state
power consumption ranges
2306

Compute the sum of squared deviations of the
ordered collected data from the mean of each
operational state power consumption range
2308

Stopping
criteria met?
2310

—NO→

Adjust the thresholds for
defining the operational
state power consumption
ranges
2312

YES

Set thresholds based on sums of squared
deviations
2314

Store thresholds as operational state power
consumption thresholds for instrument
2316

FIG. 5

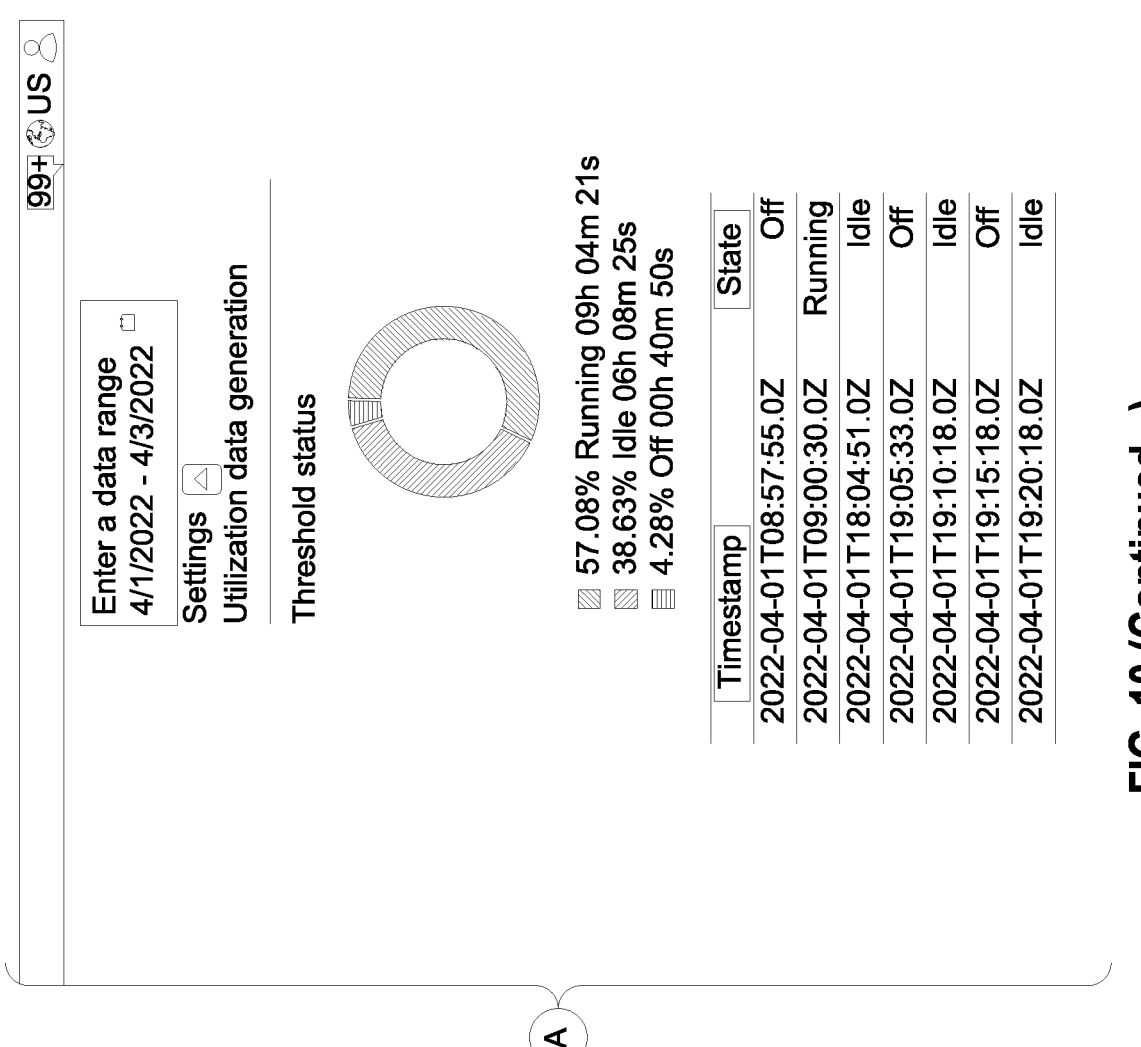
FIG. 10 (Continued...)

Demo Company

| Utilization Hours | Avg Utilization Hours | Instrument Count | Utilization % | PM | CM |
|---|---|---|---|---|---|
| 15.56K | 2.24 | 41 | 28.0% | 30 | 36 |

| System Description | Utilization Hours | Asset Days of Operations | Asset Days Monitored | Utilization% | PM Count | CM Count | ETTR Days | Other Count |
|---|---|---|---|---|---|---|---|---|
| SPECTROMETER - MS,SYSTEM | 15,560.77 | 1,976 | 6,952 | 28.0% | 30 | 36 | 119.22 | 1 |
| Manufacturer A | 8,252.88 | 935 | 2,515 | 41.0% | 6 | 22 | 51.52 | |
| Instrument 0001 | 2,509.22 | 275 | 456 | 68.8% | 2 | 2 | 6.61 | |
| Instrument 0002 | 686.01 | 53 | 172 | 49.9% | | 1 | 4.01 | |
| Instrument 0003 | 4,662.30 | 528 | 1,374 | 42.4% | 2 | 18 | 40.81 | |
| Instrument 0004 | 247.65 | 49 | 170 | 18.2% | | 1 | 0.09 | |
| Instrument 0005 | 104.87 | 14 | 171 | 7.7% | 1 | | | |
| Instrument 0006 | 42.83 | 16 | 172 | 3.1% | 1 | | | |
| Manufacturer B | 7,307.89 | 1,041 | 4,437 | 20.6% | 24 | 14 | 67.70 | 1 |
| Instrument 0011 | 1,751.60 | 187 | 514 | 42.6% | 2 | 3 | 3.67 | |
| Instrument 0012 | 1,489.89 | 171 | 514 | 36.2% | 4 | 1 | 2.29 | 1 |
| Instrument 0013 | 3,693.35 | 496 | 2,399 | 19.2% | 14 | 6 | 20.9 | |
| Instrument 0014 | 174.64 | 23 | 171 | 12.8% | 1 | | | |
| Instrument 0015 | 121.28 | 111 | 343 | 4.4% | 1 | 1 | 32.35 | |
| Instrument 0016 | 43.06 | 19 | 152 | 3.5% | 1 | 3 | 9.30 | |
| Instrument 0017 | 21.67 | 23 | 172 | 1.6% | 1 | | | |
| Instrument 0018 | 12.40 | 11 | 172 | 0.9% | | | | |
| Total | 15,560.77 | 1,976 | 6,952 | 28.0% | 30 | 36 | 119.22 | 1 |

SYSTEMS AND METHODS FOR SCIENTIFIC INSTRUMENT UTILIZATION TRACKING

BACKGROUND

Scientific instruments may include a complex arrangement of movable components, sensors, input and output ports, energy sources, and consumable components. Different scientific instruments in a laboratory or other setting may have different manufacturers, different hardware capabilities, or different software capabilities, and may or may not be capable of communication between instruments or with a central instrument manager.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 4 is a flow diagram of an example method of configuring scientific instrument utilization tracking settings, in accordance with various embodiments.

FIG. 5 is a flow diagram of an example method of generating operational state criteria for utilization tracking of a scientific instrument, in accordance with various embodiments.

FIG. 6 is a flow diagram of an example method of using scientific instrument utilization tracking settings for utilization tracking of a scientific instrument, in accordance with various embodiments.

FIGS. 12-13 are examples of GUIs that may be used to display utilization information for a collection of multiple scientific instruments, in accordance with various embodiments.

DETAILED DESCRIPTION

Figure 1:
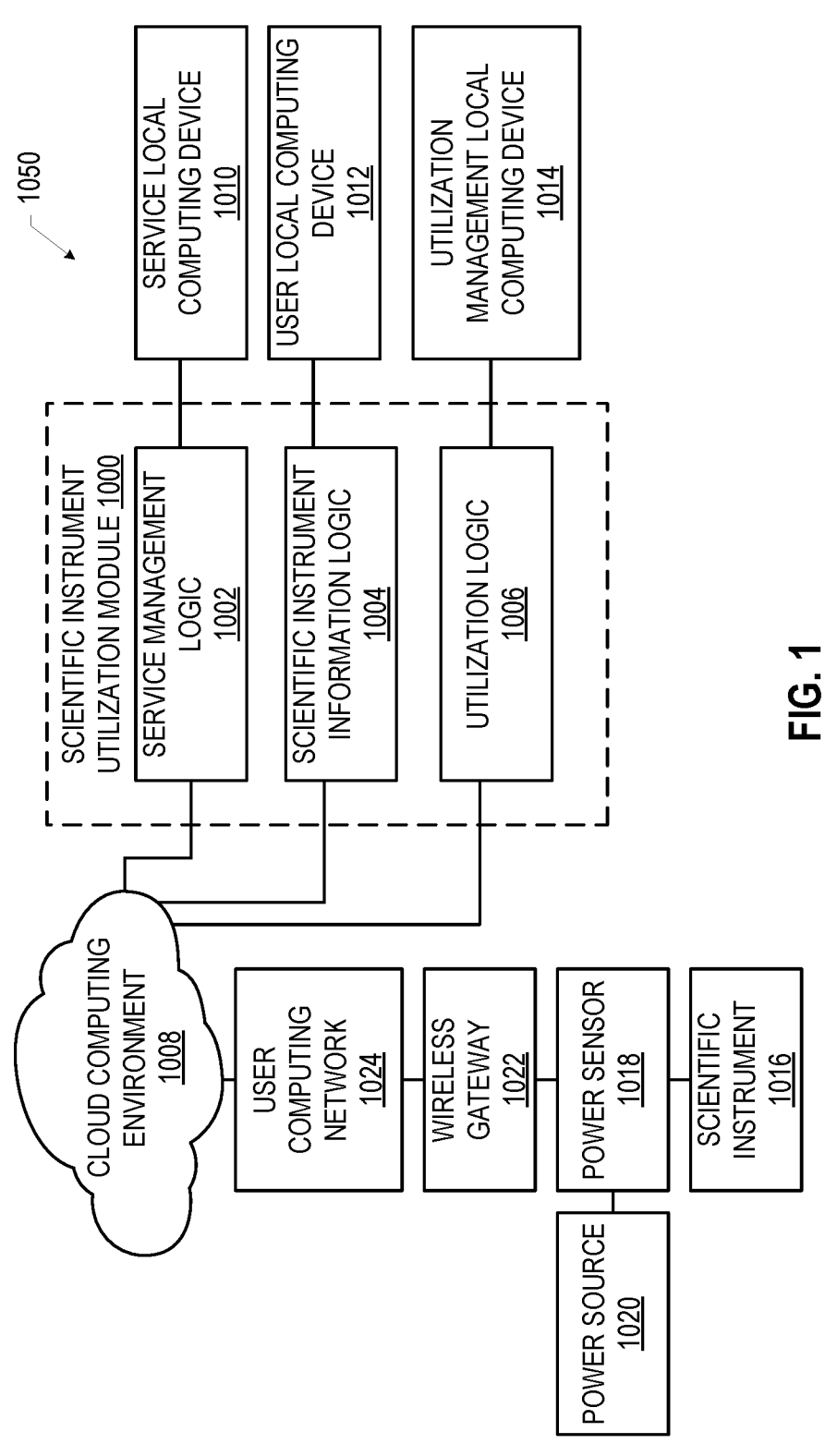
FIG. 1 is a block diagram of an example scientific instrument utilization tracking system including module for performing utilization tracking operations, in accordance with various embodiments.

Disclosed herein are scientific instrument utilization tracking systems, as well as related methods, computing devices, and computer-readable media. For example, in some embodiments, a method of tracking utilization of a scientific instrument may include: receiving, at a computing system, first data from a power sensor associated with the scientific instrument, wherein the power sensor monitors power consumption by the scientific instrument; generating, by the computing system based on the first data, multiple power consumption ranges associated with corresponding operational states of the scientific instrument; receiving, at the computing system, second data from the power sensor associated with the scientific instrument; and outputting, by the computing system, indications of the operational states over time of the scientific instrument based on the second data and the power consumption ranges.

In academic and commercial laboratory settings, knowing how much users utilize different scientific instruments enables a range of operational improvements, such as predictive maintenance to avoid or minimize downtime, the automated purchase of consumables to ensure a steady supply, and informed purchasing decisions (e.g., what scientific instruments should be purchased in the next year to achieve the biggest increase in productivity or research output?). Having users manually record their use of various instruments has the benefit of low implementation overhead, but requires manual aggregation of the data, is only as accurate as the user input, and distracts users from the productive use of the instruments. Some manufacturers have installed proprietary utilization monitoring software into their scientific instruments, but this software is typically not interoperable with instruments from other manufacturers, and thus is of limited use in a setting that includes multiple instruments from multiple manufacturers. Some third parties have offered software-based instrument monitoring services that attempt to be manufacturer-independent and review log files generated by instruments during operation, but achieving compatibility with the instruments of all manufacturers is a substantial practical challenge. Further, many scientific instruments in sensitive settings (for example, highly proprietary research and development) are subject to intensive security efforts, including avoiding the installation of third-party software and "air gapping" the instruments so that there is no electronic means of communication to external servers; this makes conventional software-based instrument monitoring a challenge, if not impossible.

The embodiments disclosed herein may achieve a number of advantages relative to conventional approaches to monitoring utilization of scientific instruments. For example, various ones of the embodiments disclosed herein provide an automated process for tracking scientific instrument utilization based on the power consumption of the instrument; such embodiments avoid the user efforts associated with manual methods, may be agnostic to the instrument manufacturer, do not require access to the instrument software (which may mitigate or avoid the requalification of instrument software often required in regulated environments), and may in some cases be installed by the user of the scientific instrument (e.g., without requiring a service visit). Further, the methods disclosed herein may achieve faster, more efficient, and more accurate power sensor data processing by identifying relevant operational thresholds from the sensor data itself, and thereby reducing or minimizing the number of power data points whose categorization is done improperly (e.g., due to noise in the signal or poorly set thresholds). The embodiments disclosed herein thus provide improvements to scientific instrument technology (e.g., improvements in the computer technology supporting such scientific instruments, among other improvements).

Various ones of the embodiments disclosed herein may improve upon conventional approaches to achieve the technical advantages of improved utilization tracking, improved service scheduling, accelerated sensor data processing, and/or improved instrument failure detection by using automated techniques for identifying operational states of a scientific instrument. Such technical advantages are not achievable by routine and conventional approaches, and all users of systems including such embodiments may benefit from these advantages. The technical features of the embodiments disclosed herein are thus decidedly unconventional in the field of scientific instrument operations, as are the combinations of the features of the embodiments disclosed herein. The computational and user interface features disclosed herein do not only involve the collection and comparison of information, but apply new analytical and technical techniques to change the operation of scientific instrument utilization tracking systems.

Accordingly, the embodiments of the present disclosure may serve any of a number of technical purposes, such as assisting with a specific technical system or process; determining from measurements how to control, service, or schedule a machine; and/or providing a more accurate processing of sensor data.

The embodiments disclosed herein thus provide improvements to scientific instrument monitoring technology (e.g., improvements in the computer technology supporting laboratory operations, among other improvements).

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a scientific instrument utilization tracking system 1050 for performing utilization tracking operations, in accordance with various embodiments. In particular, the system 1050 may be used to enable, configure, and track utilization of the scientific instrument 1016. The scientific instrument 1016 may be any suitable scientific instrument, such as (but not limited to) chromatography instruments, mass spectrometry instruments, spectroscopy instruments, liquid handlers, plate readers, flow cytometers, centrifuges, nuclear magnetic resonance instruments, sequencers, polymerase chain reaction instruments, refrigeration systems, or other instruments. The system 1050 may include a scientific instrument utilization module 1000 in communication with a service local computing device 1010 (which may be, for example, the service local computing device 5030 discussed below with reference to FIG. 18), a user local computing device 1012 (which may be, for example, the user local computing device 5020 discussed below with reference to FIG. 18), and a utilization management local computing device 1014 (which may be, for example, the remote computing device 5040 discussed below with reference to FIG. 18). The scientific instrument utilization module 1000 may also be in communication with a cloud computing environment 1008, which may in turn be in communication with a power sensor 1018 coupled between the scientific instrument 1016 (which may be, for example, the scientific instrument 5010 discussed below with reference to FIG. 18) and the power source 1020. The power sensor 1018 may communicate data, representative of power consumption by the scientific instrument 1016, wirelessly to a wireless gateway 1022, which may in turn communicate with the cloud computing environment 1008 via an intervening user computing network 1024 (e.g., a local area network (LAN) controlled by the information technology team at the user site).

The system 1050 may be used to enable power monitoring of the scientific instrument 1016 for the purposes of utilization tracking. In such operations, the module 1000 may provide a GUI (e.g., a "Utilization Manager" GUI, such as the GUI discussed below with reference to FIG. 7), to the user local computing device 1012, that includes an option for a user, such as a laboratory manager, associated with the scientific instrument 1016 to request that power monitoring of the scientific instrument 1016 be enabled. When selected by the user, the module 1000 may create a service ticket (e.g., in a "Service Manager" GUI, such as the GUI discussed below with reference to FIG. 8) for a service technician to go to the site of the scientific instrument 1016 and install a power sensor 1018 (and any associated hardware or software) between the scientific instrument 1016 and the power source 1020, or for a power sensor 1018 (and any associated hardware or software) to be shipped or provided to the site of the scientific instrument 1016 for installation by a user or technician associated with the site. Such a power sensor 1018 may be referred to as an inline machine monitor in some embodiments. The service technician may also install a wireless gateway 1022 for communication with the power sensor 1018 (if such a wireless gateway 1022 is not already present), and the power sensor 1018 may be configured, by the service technician, to communicate with a wireless gateway 1022 at the site of the scientific instrument 1016, and the user's information technology team may enable communication between the wireless gateway 1022 and the user computing network 1024. Once communication between the module 1000 and the power sensor 1018 is established, the module 1000 may configure scientific instrument utilization tracking settings specific to the scientific instrument 1016 (e.g., to the class of scientific instruments to which the scientific instrument 1016 belongs, as discussed further below), which may include criteria to be applied to the power consumption data to determine the operational state of the scientific instrument 1016. A utilization technician may monitor or manage the scientific instrument utilization tracking settings for the scientific instrument 1016 via a GUI (e.g., a "Tuning Console" GUI, such as the GUI discussed below with reference to FIGS. 9-10) provided by the module 1000. On completion of configuration of the scientific instrument utilization tracking settings, the module 1000 may provide confirmation to the user local computing device 1012 (e.g., via the "Utilization Manager" GUI) that power monitoring for utilization tracking of the scientific instrument 1016 has been enabled.

The system 1050 may be used to track utilization of the scientific instrument 1016 by monitoring power consumption of the scientific instrument 1016 via the power sensor 1018. In such operations, the power sensor 1018 may monitor the consumption of power from the power source 1020 (which may be, for example, a wall outlet or other source of electrical power) by the scientific instrument 1016 and may transmit data representative of this power consumption to the cloud computing environment 1008 (e.g., via the wireless gateway 1022 and the user computing network 1024). The cloud computing environment 1008 may provide the power consumption data to the module 1000, which may use the power consumption data to generate utilization information that can be provided to the scientific instrument information logic 1004 and shared with the user (e.g., a laboratory manager) via a GUI (e.g., the "Utilization Manager" GUI) provided to the user local computing device 1012.

Note that the system 1050 illustrated in FIG. 1 includes a single scientific instrument 1016, but this is simply for clarity of illustration, and the system 1050 may be used to track utilization of multiple scientific instruments 1016 distributed among one or more sites associated with a user, as discussed further herein. In some such embodiments, the system 1050 may include one or more wireless gateways 1022 that each communicate with one or more power sensors 1018 (associated with corresponding scientific instruments 1016). In some embodiments, a power sensor 1018 may communicate directly with the user computing network 1024 without an intervening wireless gateway 1022. In some embodiments, a power sensor 1018 may communicate directly with the cloud computing environment 1008 without an intervening wireless gateway 1022 or an intervening user computing network 1024. In some embodiments, a wireless gateway 1022 may communicate directly with the cloud computing environment 1008 without an intervening user computing network 1024. In some embodiments, the power sensors 1018 may form a wireless mesh, with utilization-related data able to "hop" from one sensor to another (e.g., when a wireless gateway 1022 is not within wireless broadcast range, or under other circumstances).

In some embodiments, the communication between the power sensor 1018 and the wireless gateway 1022 or the user computing network 1024 may use a wireless communication protocol different from a WiFi protocol so as to avoid competing or conflicting with other WiFi communications at the user site. For example, in some embodiments, the communication between the power sensor 1018 and the wireless gateway 1011/user computing network 1024 is in accordance with a Wireless Personal Area Network (WPAN) protocol (e.g., the IEEE 802.15.4 wireless protocol) or other wireless communication protocol.

The scientific instrument utilization module 1000 may be configured for performing utilization tracking operations, in accordance with various embodiments. The module 1000 may be implemented by circuitry (e.g., including electrical and/or optical components), such as a programmed computing device. The logic of the scientific instrument utilization tracking module 1000 may be included in a single computing device, or may be distributed across multiple computing devices that are in communication with each other as appropriate. In some embodiments, some or all of the logic of the module 1000 may be part of the cloud computing environment 1008. Examples of computing devices that may, singly or in combination, implement the scientific instrument utilization tracking module 1000 are discussed herein with reference to the computing device 4000 of FIG. 17, and examples of systems of interconnected computing devices, in which the scientific instrument utilization tracking module 1000 may be implemented across one or more of the computing devices, is discussed herein with reference to the scientific instrument utilization tracking system 5000 of FIG. 18.

The scientific instrument utilization tracking module 1000 may include service management logic 1002, scientific instrument information logic 1004, and utilization logic 1006. As used herein, the term "logic" may include an apparatus that is to perform a set of operations associated with the logic. For example, any of the logic elements included in the module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The service management logic 1002 may manage service operations associated with the scientific instrument 1016. In some embodiments, the service management logic 1002 may provide a "Service Manager" GUI (e.g., as discussed below with reference to FIG. 8) to one or more service local computing devices 1010 that enable service technicians to monitor the current operational state of the scientific instrument 1016, past and future maintenance operations performed on the scientific instrument 1016, service requests from users of the scientific instrument 1016, and other service- and performance-related information. The service management logic 1002 may be in communication with the scientific instrument information logic 1004; in some embodiments, service requests from users of the scientific instrument 1016 may be provided to the service management logic 1002 from the user local computing device 1012 via the scientific instrument information logic 1004, and these the service requests may be displayed for service technicians via the "Service Manager" GUI at the service local computing device 1010. As discussed below, in some embodiments, one such service request may be a request to enable power monitoring for utilization tracking of the scientific instrument 1016.

The scientific instrument information logic 1004 may collect and provide information about the scientific instrument 1016 to a user (e.g., a laboratory manager) at a user local computing device 1012. In some embodiments, the scientific instrument information logic 1004 may provide, to one or more user local computing devices 1012, a "Utilization Manager" GUI (e.g., as discussed below with reference to FIGS. 7 and 11-14) that provides information about the utilization of the scientific instrument 1016. This utilization information may be provided to the scientific instrument information logic 1004 by the utilization logic 1006, as discussed further below. The scientific instrument information logic 1004 may also relay requests and information between the user local computing device 1012 and the service management logic 1002; for example, as discussed further below with reference to FIG. 14, the scientific instrument information logic 1004 may provide a GUI that includes both utilization tracking information for the scientific instrument 1016 and service information for the scientific instrument 1016.

The utilization logic 1006 may receive data representative of power consumption by the scientific instrument 1016, may generate thresholds or other criteria for operational states of the scientific instrument 1016 based on the power consumption data, and may output data representative of these operational states to the scientific instrument information logic 1004 for providing to the user local computing device 1012 (e.g., via a "Utilization Manager" GUI, as discussed herein). The utilization logic 1006 may also provide a "Tuning Console" GUI (e.g., as discussed below with reference to FIGS. 9-10) to one or more utilization management local computing devices 1014 that allows utilization technicians (which may be the same technicians as the service technicians discussed above with reference to the service local computing device 1010 or a different set of technicians) to adjust the operational state criteria and/or monitor instrument utilization data. In some embodiments, the utilization management local computing device 1014 may be the same as the service local computing device 1010, and the "Tuning Console" GUI provided by the utilization logic 1006 may be integrated into a common GUI with the "Service Manager" GUI provided by the service management logic 1002. As noted above, the utilization logic 1006 may generate the operational state criteria for the scientific instrument 1016 based on data representative of power consumption by the scientific instrument 1016, as discussed further below with reference to FIG. 5, and may use the power consumption data and the operational state criteria for the scientific instrument 1016 to generate information about the utilization of the scientific instrument 1016, as discussed below with reference to FIG. 6.

FIGS. 2-6 are flow diagrams of methods of performing utilization tracking operations, in accordance with various embodiments. Although the operations of the methods of FIGS. 2-6 may be illustrated with reference to particular embodiments disclosed herein (e.g., the system 1050, the logic of the module 1000, the GUIs of FIGS. 7-14, etc.), the methods of FIGS. 2-6 may be used in any suitable setting to perform any suitable utilization tracking operations. Operations are illustrated once each and in a particular order in the flow diagrams of FIGS. 2-6, but the operations may be reordered and/or repeated as desired and appropriate (e.g., different operations performed may be performed in parallel, as suitable).

Figure 2:
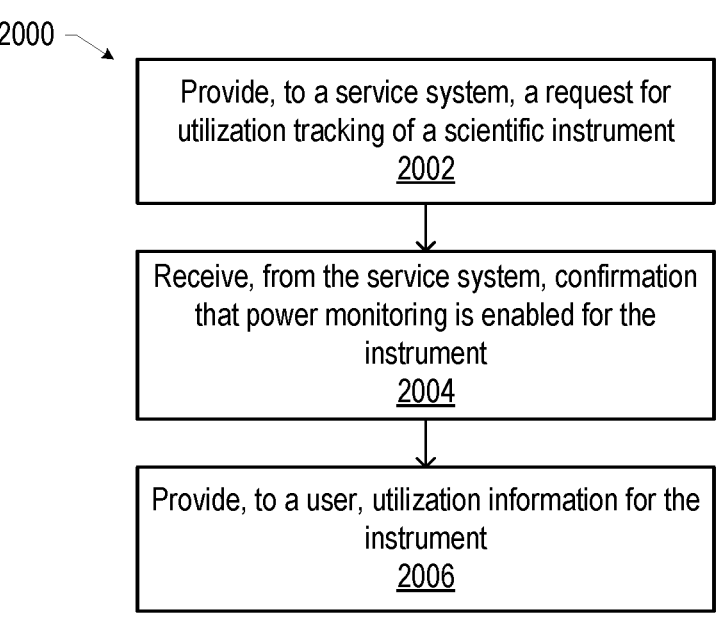
FIG. 2 is a flow diagram of an example method of tracking utilization of a scientific instrument, in accordance with various embodiments.

FIG. 2 is a flow diagram of an example method 2000 of tracking utilization of a scientific instrument, in accordance with various embodiments. In some embodiments, the method 2000 may be performed by the scientific instrument information logic 1004 of the module 1000. The method 2000 may utilize a "Utilization Manager" GUI provided by the scientific instrument information logic 1004 to the user local computing device 1012; the user local computing device 1012 may receive user input (e.g., input from a laboratory manager) via the GUI and may provide displays of information to the user via the GUI.

At 2002, a request for utilization tracking of a scientific instrument may be provided to a service system. For example, the scientific instrument information logic 1004 of the module 1000 may perform the operations of 2002 in response to identification of a user activation of the "Click Here To Request Utilization Tracking" option for the scientific instrument 1016 labeled as "Instrument ID: 510111" in the "Utilization Manager" GUI of FIG. 7. The service system to which the request is provided may be the service management logic 1002, which may notify a service technician that the user would like to enable utilization tracking for the particular scientific instrument 1016, in response to which a service technician may be dispatched to the site of the scientific instrument 1016 to install any required monitoring software and/or hardware (e.g., the power sensor 1018 and a wireless gateway 1022), or a power sensor 1018 (and any associated hardware or software) may be shipped or provided to the site of the scientific instrument 1016 for installation by a user or technician associated with the site. Such installation may include, in some embodiments, unplugging the power cable of the scientific instrument 1016 from the power source 1020, plugging the power cable of the scientific instrument 1016 into the power sensor 1018, and plugging the power sensor 1018 into the power source 1020.

Figure 3:
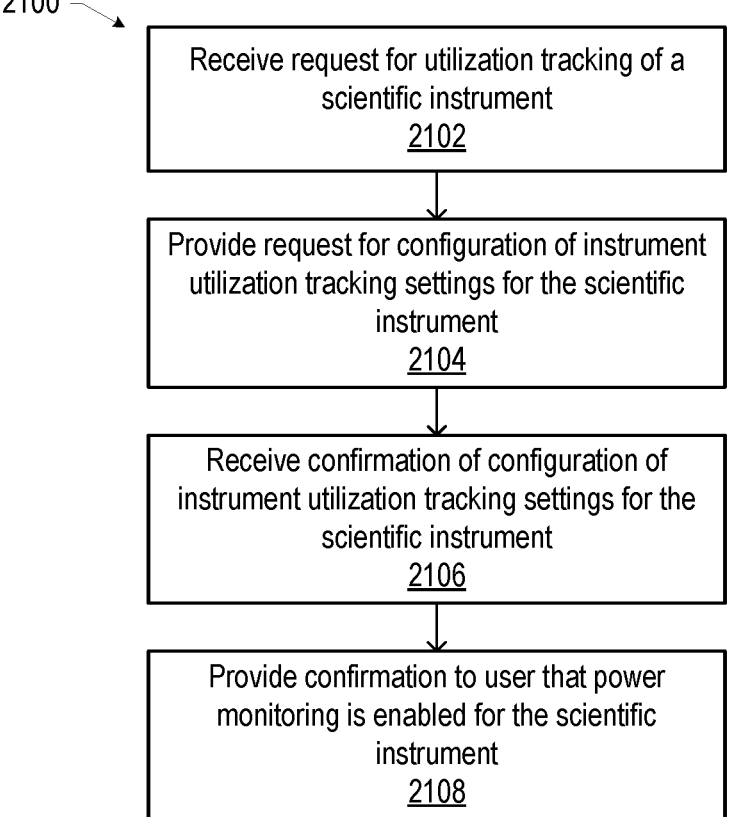
FIG. 3 is a flow diagram of an example method of enabling utilization tracking, in accordance with various embodiments.

In some embodiments, the method 2100 of FIG. 3 may be performed by the service system in response to receipt of the request provided at 2002.

At 2004, confirmation that power monitoring is enabled for the scientific instrument may be received from the service system. For example, the scientific instrument information logic 1004 of the module 1000 may perform the operations of 2004, and the confirmation may be provided by the service management logic 1002 at 2110 of the method 2100 of FIG. 3. In some embodiments, the confirmation may be provided in response to a service technician using the "Service Manager" GUI of FIG. 8 to select "Yes" in the "Utilization Monitoring" field, "Power" in the "Utilization Type" field, and a particular identifier for the power sensor 1018 in the "Power Sensor ID" field, after the service technician has completed any required installation or a user has confirmed installation. In some embodiments, a communication connection between the power sensor 1018 and the wireless gateway 1022 or the user computing network 1024 may be automatically detected (e.g., by the power sensor 1018, the wireless gateway 1022, or the user computing network 1024), and a confirmation message may be sent to the service system automatically for receipt at 2004.

In some embodiments, the system 1050 may simultaneously manage different scientific instruments 1016 whose utilization is being monitored using different monitoring techniques. For example, at a single user site, some scientific instruments 1016 may be monitored using the power monitoring techniques disclosed herein, while other scientific instruments 1016 may be monitored using software-based monitoring techniques (e.g., those that monitor log files or other software records of use of the scientific instrument, as discussed above); for those scientific instruments 1016 being monitored using software-based techniques, "Software" may be selected in the "Utilization Type" field of the GUI of FIG. 8. In some embodiments, utilization of a single scientific instrument 1016 may be monitored using both power monitoring and software monitoring techniques (e.g., to compare the results of both types of monitoring); in such an embodiment, "Power and Software" may be selected in the "Utilization Type" field of the GUI of FIG. 8. Any of the GUIs or other uses of the utilization data discussed herein may include both power monitoring and software monitoring utilization techniques as desired; for example, the scientific instrument utilization module 1000 may combine and analyze power-based and software-based utilization data and provide those results via any of the GUIs discussed herein.

At 2006, utilization information for the scientific instrument may be provided to a user. For example, the scientific instrument information logic 1004 of the module 1000 may perform the operations of 2006, and may provide the utilization information to the user local computing device 1012 via the "Utilization Manager" GUI (e.g., in accordance with any of the examples of FIGS. 11-14). In some embodiments, the scientific instrument information logic 1004 may receive the utilization information from the utilization logic 1006 upon generation of the utilization information by the utilization logic 1006 in accordance with the method 2400 of FIG. 6.

FIG. 3 is a flow diagram of an example method 2100 of enabling utilization tracking, in accordance with various embodiments. In some embodiments, the method 2100 may be performed by the service management logic 1002 of the module 1000. The method 2100 may utilize a "Service Manager" GUI provided by the service management logic 1002 to the service local computing device 1010; the service local computing device 1010 may receive input from a service technician via the GUI and may provide displays of information to the service technician via the GUI. In some embodiments, a method like that of method 2100 may be used to allow a power sensor 1018 to be moved from one scientific instrument 1016 to another scientific instrument 1016.

At 2102, a utilization tracking request for a scientific instrument may be received. For example, the service management logic 1002 may receive the request provided at 2002 of the method 2000 of FIG. 2. The service management logic 1002 may display information about the utilization tracking request to a service technician at the service local computing device 1010 via a "Service Manager" GUI. In response to receipt of a utilization tracking request for a particular scientific instrument 1016, the service technician may go to the site of the scientific instrument and install a power sensor 1018 between the scientific instrument and the power source 1020. In some embodiments, the power supply cable of the scientific instrument 1016 may be plugged into the power sensor 1018, and a power supply cable from the power sensor 1018 may be plugged into the power source 1020. The power sensor 1018 may allow power to pass through the power sensor 1018 from the power source 1020 to the scientific instrument 1016, and may transmit data representative of the power consumption of the scientific instrument 1016 in a wired or wireless fashion. In some embodiments, the service technician may install a new wireless gateway 1022, or may utilize an existing wireless gateway 1022, and may configure the wireless gateway 1022 to receive the power consumption data wirelessly from the power sensor 1018 and transmitted to the user computing network 1024 (e.g., the local computing network at the site of the scientific instrument 1016) for transmission back to the module 1000, as discussed above. In some embodiments, upon completion of the installation of the power sensor 1018 and confirmation of the communication pathway between the power sensor 1018 and the module 1000, the service technician may use the "Service Manager" GUI to "turn on" power monitoring of the scientific instrument 1016 by selecting "Yes" in the "Utilization Monitoring" field, by selecting "Power" in the "Utilization Type" field, and by entering an identifier of the particular power sensor 1018 installed at the particular scientific instrument 1016 in the "Power Sensor ID" field so that the power consumption data provided by the power sensor 1018 can be associated with the correct scientific instrument 1016. In some other embodiments, a communication connection between the power sensor 1018 and the wireless gateway 1022 or the user computing network 1024 may be automatically detected (e.g., by the power sensor 1018, the wireless gateway 1022, or the user computing network 1024), and a confirmation message may be sent to the service system automatically for receipt at 2004. The identifier of the power sensor 1018, an identifier of the scientific instrument 1016, and any other relevant information may be provided from the service management logic 1002 to the utilization logic 1006 for use in generating utilization information.

At 2104, a request for configuration of instrument utilization tracking settings for the scientific instrument may be provided to a tracking system. For example, the service management logic 1002 may perform the operations of 2104, and the tracking system to which the request is provided may be the utilization logic 1006. In some embodiments, the method 2200 of FIG. 4 may be performed by the tracking system in response to receipt of the request provided at 2104.

At 2106, confirmation of configuration of the instrument utilization tracking settings may be received from the tracking system. For example, the service management logic 1002 of the module 1000 may perform the operations of 2106, and the confirmation may be provided by the utilization logic 1006 at 2210 of the method 2200 of FIG. 4.

At 2108, confirmation may be provided to the scientific instrument user that power monitoring is now enabled for the scientific instrument. For example, the service management logic 1002 of the module 1000 may perform the operations of 2108 by sending a message directly to the user local computing device 1012 or by providing the confirmation information to the scientific instrument information logic 1004, which may display the confirmation information to the user local computing device 1012 via the "Utilization Manager" GUI.

FIG. 4 is a flow diagram of an example method 2200 of configuring scientific instrument utilization tracking settings, in accordance with various embodiments. In some embodiments, the method 2200 may be performed by the utilization logic 1006. The method 2200 may utilize a "Tuning Console" GUI provided by the utilization logic 1006 to the utilization management local computing device 1014; the utilization management local computing device 1014 may receive input from a utilization technician via the GUI and may provide displays of information to the utilization technician via the GUI.

At 2202, a request for configuration of instrument utilization tracking settings may be received from a service system. For example, the utilization logic 1006 may receive the request provided at 2104 of the method 2100 of FIG. 3 (e.g., from the service management logic 1002). In some embodiments, the request received at 2202 may include an identifier of the scientific instrument 1016, an identifier of the power sensor 1018, an identifier of the wireless gateway 1022, and/or any other suitable information to enable the utilization logic to establish an effective communication pathway for the power consumption data generated by the power sensor 1018.

Figure 9:
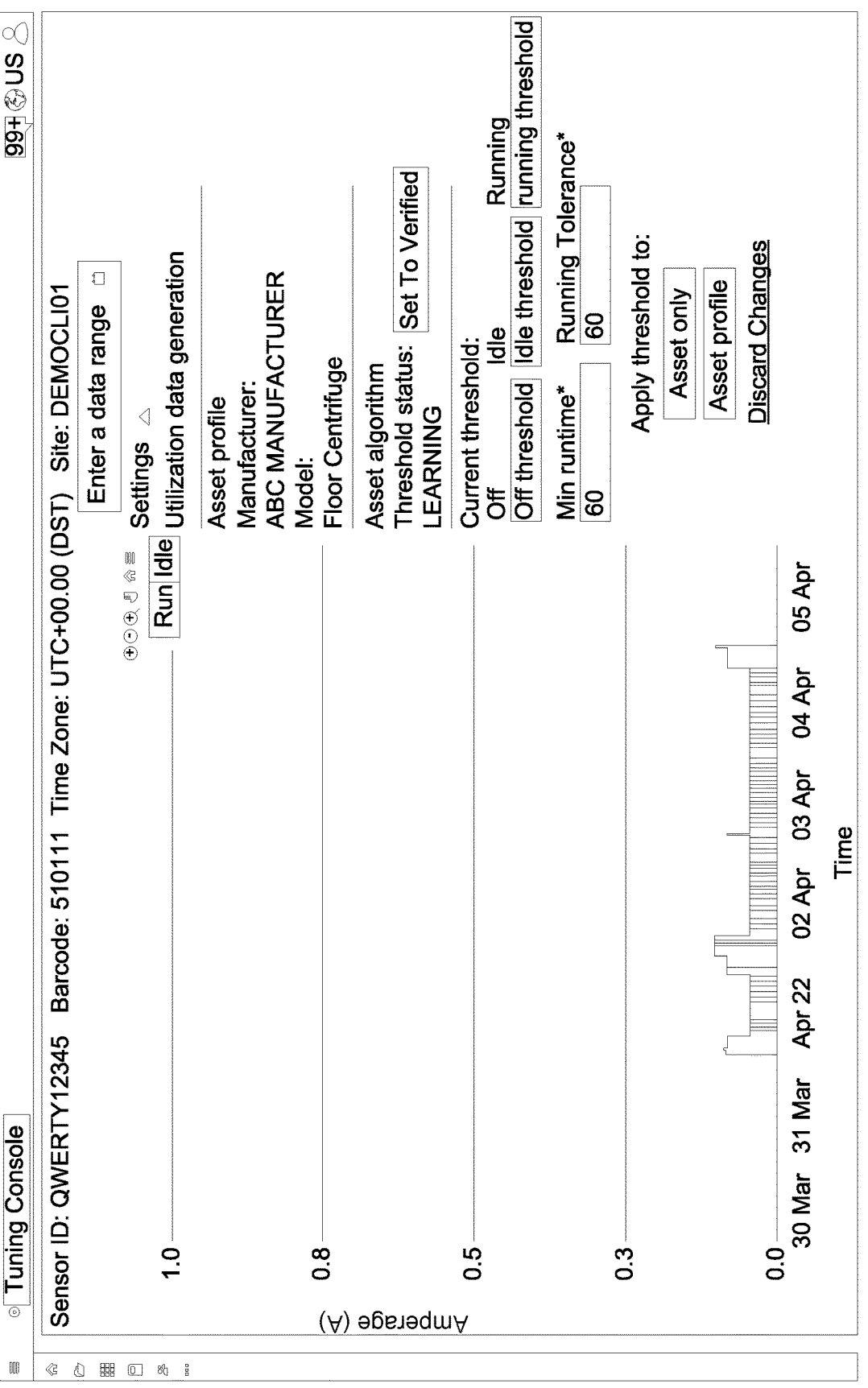
FIG. 9 is an example of a GUI that may be used to set power thresholds for use in utilization tracking of a scientific instrument, in accordance with various embodiments.

At 2204, power consumption data for the scientific instrument may be received. For example, the utilization logic 1006 may receive data from the power sensor 1018 representative of power consumption by the scientific instrument 1016. Power consumption data may be received by the utilization logic 1006 before the utilization logic 1006 has generated or has otherwise had set the scientific instrument utilization tracking settings. FIG. 9 illustrates an example of the output of the "Tuning Console" GUI, provided by the utilization logic 1006 to the utilization management local computing device 1014, before any operational state criteria have been generated by the utilization logic; as shown in FIG. 9, the plot on the left side reflects power consumption by the scientific instrument 1016 while the "Threshold status" indicative of the operational state criteria is shown as "Learning," indicating that the utilization logic 1006 is still in the process of generating the relevant operational state criteria. The scientific instrument utilization tracking settings may include other values that do not require the "threshold" of the operational state criteria. FIG. 9 indicates to such scientific instrument utilization tracking settings, a minimum runtime (shown as "Min runtime") and a running tolerance. The minimum runtime may be an amount of runtime required for utilization determination (e.g., to avoid confusion caused by "short" runs or spikes in power consumption); in some embodiments, the minimum runtime may have a default value (e.g., 60 seconds) and may be adjustable by a technician (e.g., via a "Tuning Console"

GUI). The running tolerance may be a minimum amount of time separation required between two runs in order for those two runs to be counted separately (i.e., two runs separated in time by a value less than the running tolerance will be treated as one run). The running tolerance may have a default value (e.g., 60 seconds) and may be adjustable by a technician (e.g., via a "Tuning Console" GUI). Values for the settings may be set by default for all scientific instruments 1016 or for a class of scientific instruments 1016, and may be adjusted by a utilization technician via the "Tuning Console" GUI.

At 2206, operational state criteria for the scientific instrument may be generated based on the received power consumption data. In some embodiments, the generation of operational state criteria at 2206 may include the generation of threshold values used to distinguish power consumption ranges associated with different operational states. For example, the utilization logic 1006 may perform the method 2300 of FIG. 5 to generate the operational state criteria at 2206. In some embodiments, effective generation of operational state criteria at 2206 may require that the scientific instrument run in different operational states over a desired monitoring period (e.g., 7 days or 14 days) so that an adequate volume of power consumption data (representative of the different operational states) may be received.

Figure 10:
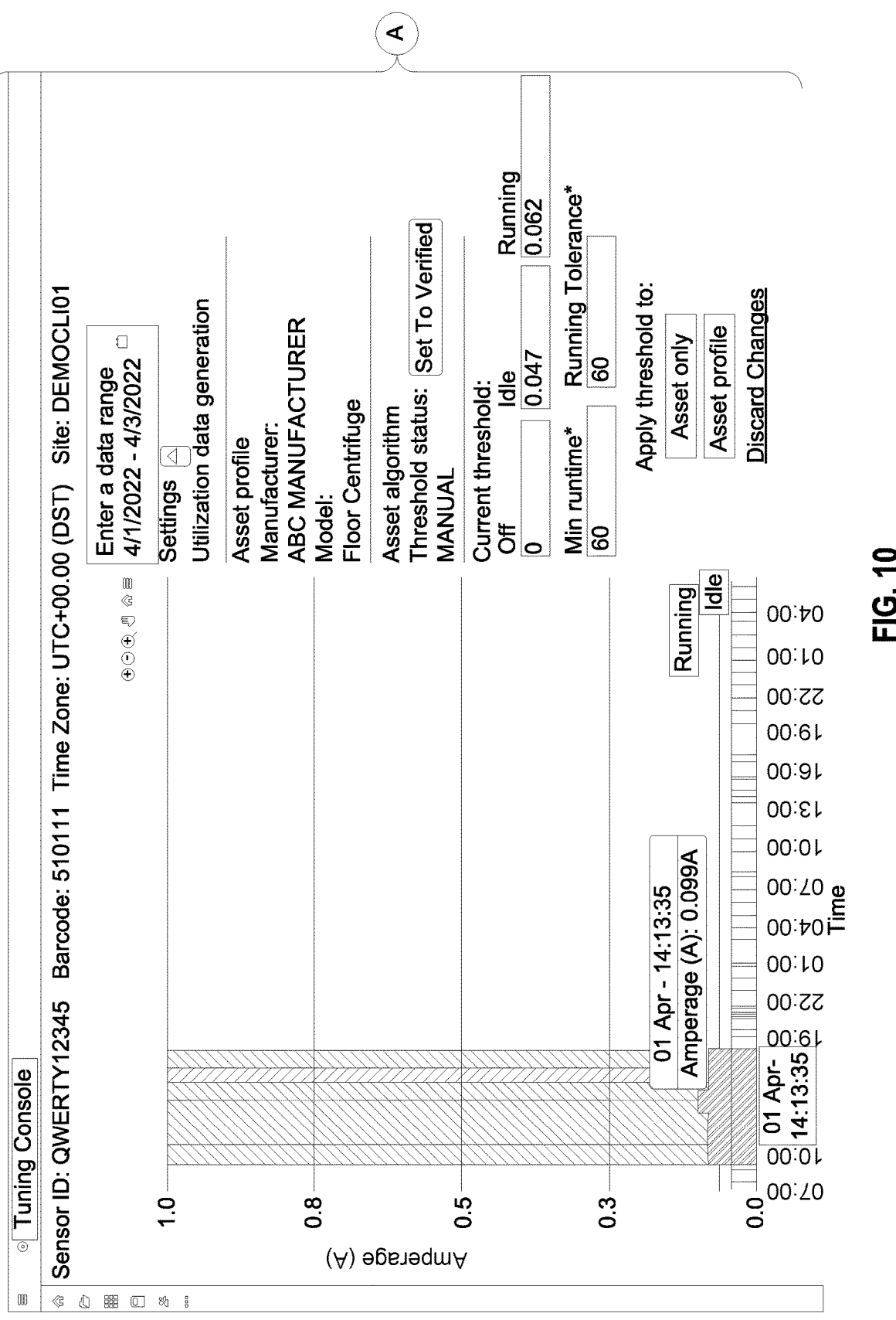
FIGS. 10-11 are examples of GUIs that may be used to display utilization information for a scientific instrument, in accordance with various embodiments.

At 2208, the operational state criteria may be stored as part of the scientific instrument utilization tracking settings. For example, the utilization logic 1006 may store the operational state criteria generated at 2206, the operational state criteria via the "Tuning Console" GUI, as illustrated in FIG. 10. In the particular example of FIG. 10, the operational state criteria include three thresholds to which the power consumption of the scientific instrument 1016 may be compared: an "Off" threshold (indicated in FIG. 10 as "0"), an "Idle" threshold (indicated in FIG. 10 as "0.047"), and a "Running" threshold (indicated in FIG. 10 as "0.062"). These thresholds delineate ranges of power consumption data associated with different ones of the operational states; in this example, the scientific instrument 1016 is in the operational state "Off" when the current power consumption data provided by the power sensor 1018 is between 0 and 0.047, the scientific instrument 1016 is in the operational state "Idle" when the current power consumption data provided by the power sensor 1018 is between 0.047 and 0.062, and the scientific instrument 1016 is in the operational state "Running" when the current power consumption data provided by the power sensor 1018 is greater than 0.062. This particular number of operational states for a scientific instrument 1016 is simply illustrative, and a scientific instrument 1016 may have fewer than three or more than three operational states depending upon the type and operational characteristics of the scientific instrument 1016.

At 2210, confirmation may be provided to the service system that scientific instrument utilization tracking settings have been configured. For example, the utilization logic 1006 of the module 1000 may perform the operations of 2210 by sending a message directly to the service local computing device 1010 or by providing the confirmation information to the service management logic 1002, which may display the confirmation information to the service local computing device 1010 via the "Service Manager" GUI.

FIG. 5 is a flow diagram of an example method 2300 of generating operational state criteria for utilization tracking of a scientific instrument, in accordance with various embodiments. The method 2300 of FIG. 5 including applying a data clustering technique to generate operational state criteria for utilization tracking of a scientific instrument. The particular data clustering technique included in the example of FIG. 5 is simply illustrative, and other data clustering techniques, such as Fisher's discriminant analysis, Otsu's method, head/tail breaks, natural breaks (e.g., without Jenks optimization), equal interval, quantile, and standard deviation techniques, may be used. In some embodiments, the method 2300 may be performed by the utilization logic 1006.

At 2302, a number of operational states associated with the scientific instrument may be identified. For example, a utilization technician may use the "Tuning Console" GUI to input a number of operational states associated with a particular scientific instrument 1016 and names associated with these operational states. For example, as shown in FIG. 10, a particular scientific instrument 1016 may have three operational states, "Off," "Idle," and "Running." A particular number and set of names for the operational states of the scientific instrument 1016 to be manually entered, may have a default value (e.g., three) or may be associated with a particular class of scientific instruments and retrieved from data storage associated with the utilization logic 1006. The identification of a number of operational states and names for the operational states of a scientific instruments may be customized as desired; for example, some users may wish to distinguish between a "high intensity running" state and a "low intensity running" state for a particular scientific instrument 1016, while other users may wish to simply use one "running" state for the same type of scientific instrument 1016.

At 2304, collected power consumption data may be ordered by magnitude. For example, the utilization logic 1006 may collect all received power consumption data for a particular scientific instrument 1016 (e.g., received at a particular sampling frequency) and may order the received data from smallest magnitude to largest magnitude (or vice versa). For example, if three power consumption data points, 0.1, 0.4, and 0.2 were received at three sampling times, the utilization logic may reorder this data from smallest magnitude to largest magnitude as 0.1, 0.2, and 0.4.

At 2306, initial threshold values may be set for the ordered collected data to define power consumption ranges associated with different operational states. For example, the utilization logic 1006 may select a number of threshold values equal to the number of operational states of the scientific instrument 1016 (identified at 2302). The utilization logic 1006 may select the initial threshold values randomly (e.g., by using a random number generator and the maximum and minimum values of the power consumption data) or in a predetermined manner (e.g., the range between the maximum and minimum values of the power consumption data into equal portions by the selection of the initial threshold values).

At 2308, the sum of squared deviations of the ordered collected data from the mean of each operational state power consumption range may be computed. In some embodiments, the utilization logic 1006 may perform the operations of 2308. For example, if the power consumption range associated with a particular operational state is between 0.2 and 0.4, the mean of that operational state power consumption range will be 0.3, and the utilization logic 1006 may compute the square of the difference between 0.3 and each of the ordered collected data points, and the process repeated for each operational state power consumption range.

At 2310, it may be determined whether stopping criteria has been met. For example, the stopping criteria may be reaching the minimum sum of squared deviations for different iterations of 2308; in some such embodiments, the utilization logic 1006 may determine if a minimum value has been found (e.g., for a predetermined number of iterations of the operations of 2308, such as fifty iterations). If the stopping criteria has not been met at 2310, the method 2300 may proceed to 2312, at which the thresholds that define the operational state power consumption ranges may be adjusted relative to their previous values, and the method 2300 may return to 2308.

If stopping criteria have been met at 2310, the method 2300 may proceed to 2314, at which the thresholds defining the operational state power consumption ranges may be set based on the most recently computed sums of squared deviations from 2308. For example, the utilization logic 1006 may select the thresholds associated with the smallest value of the sum of squared deviations to be the thresholds defining the operational state power consumption ranges.

At 2316, the thresholds set at 2314 may be stored as the operational state power consumption thresholds for the scientific instrument. For example, the utilization logic 1006 may store the thresholds in a local or remote memory for use by the utilization logic 1006 in using scientific instrument utilization tracking settings for utilization tracking of a scientific instrument, as discussed below with reference to FIG. 6. The thresholds stored at 2316 may be subsequently manually adjusted by a technician if desired (e.g., via a "Tuning Console" GUI).

FIG. 6 is a flow diagram of an example method 2400 of using scientific instrument utilization tracking settings for utilization tracking of a scientific instrument, in accordance with various embodiments. In some embodiments, the method 2400 may be performed by the utilization logic 1006.

At 2402, data, representative of power consumption by a scientific instrument, may be received. For example, the utilization logic 1006 may receive data from the power sensor 1018 representative of power consumption by the scientific instrument 1016, as discussed above.

At 2404, the power consumption data received at 2402 may be compared to stored operational state power consumption thresholds to identify an operational state of the scientific instrument over one or more time intervals represented by the power consumption data. For example, the utilization logic 1006 may compare individual power consumption data points, or a smoothed or otherwise filtered aggregate of multiple power consumption data points, to the operational state power consumption thresholds to identify an associated operational state of the scientific instrument 1016. As noted above with reference to FIG. 4, FIG. 10 illustrates a particular example in which the operational state criteria include three thresholds to which the power consumption of the scientific instrument 1016 may be compared: an "Off" threshold (indicated in FIG. 10 as "0"), an "Idle" threshold (indicated in FIG. 10 as "0.047"), and a "Running" threshold (indicated in FIG. 10 as "0.062").

At 2406, the operational state of the scientific instrument may be provided to one or more user interfaces. For example, the utilization logic 1006 may provide data representative of the operational state of the scientific instrument 1016 to (1) the utilization management local computing device 1014 via the "Tuning Console" GUI (as discussed herein) to allow utilization technicians to monitor instrument utilization data, (2) the scientific instrument information logic 1004 for output to the user local computing device 1012 via the "Utilization Manager" GUI (as discussed herein) to share instrument utilization data with a user of the scientific instrument 1016 or a lab manager, and/or (3) to the service management logic 1002 for output to the service local computing device 1010 via the "Service Manager" GUI (as discussed herein) to share instrument utilization data with service technicians.

Figure 7:
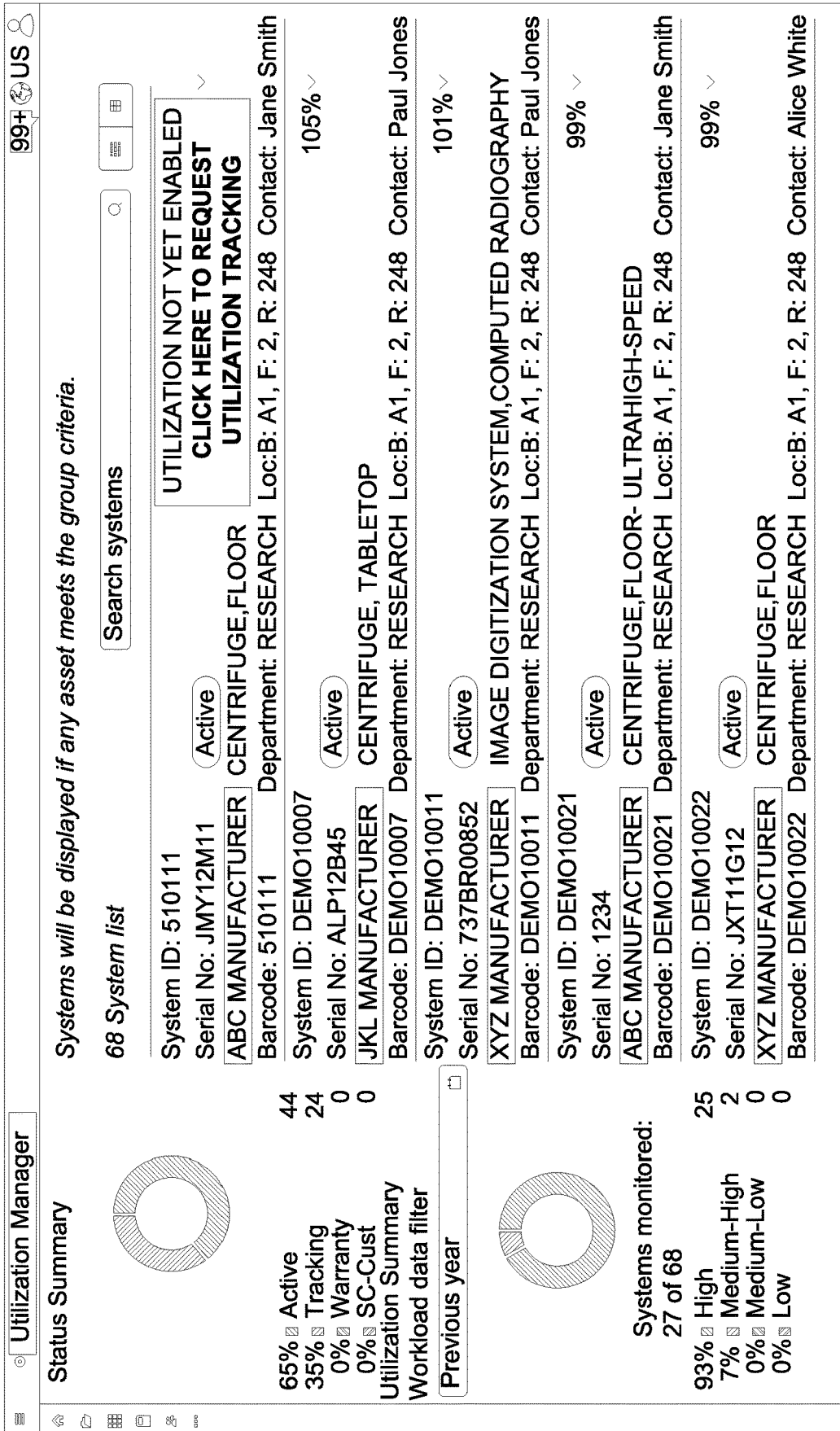
FIG. 7 is an example of a graphical user interface (GUI) that may be used to request utilization tracking for a scientific instrument, in accordance with various embodiments.
Figure 8:
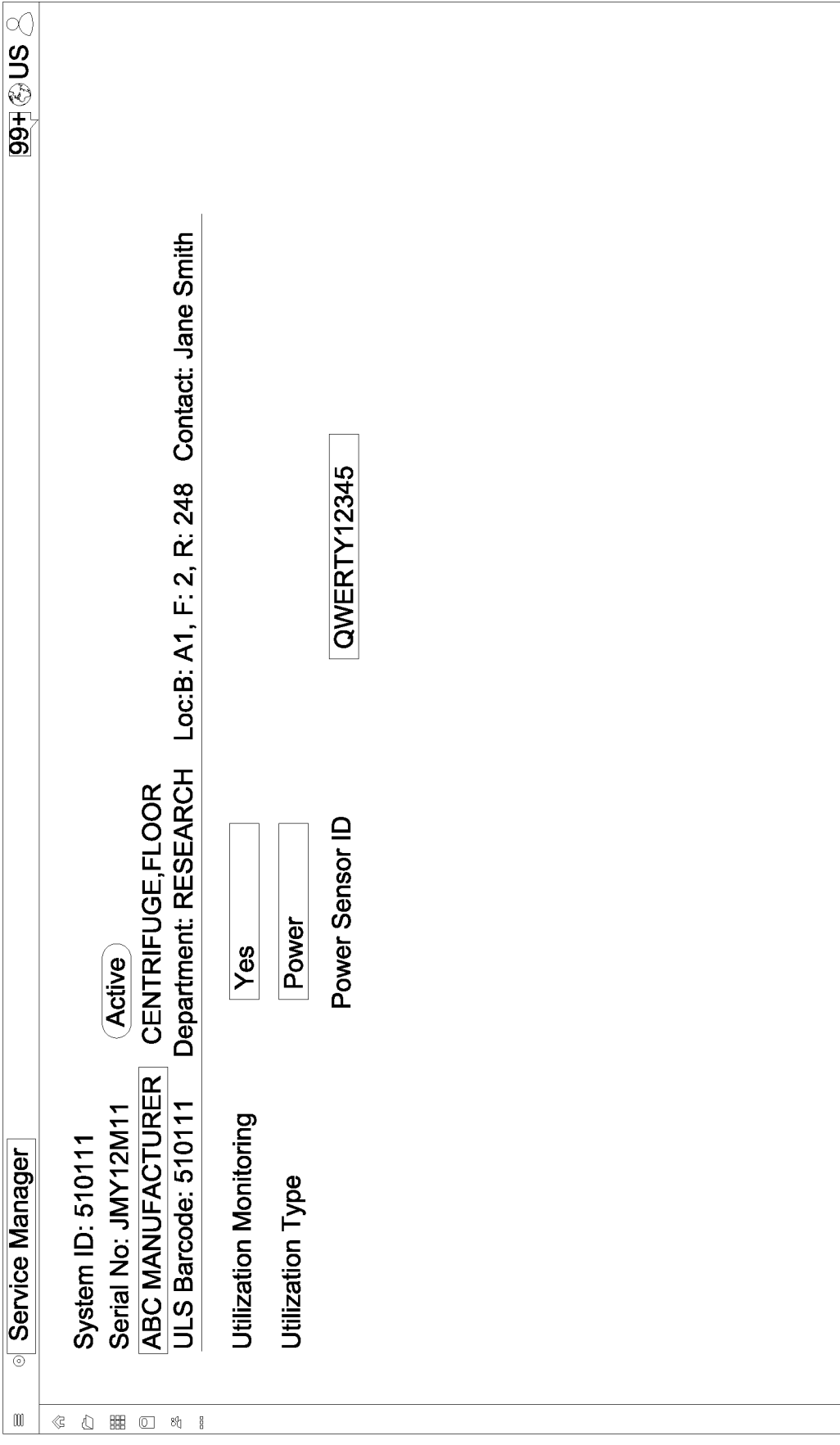
FIG. 8 is an example of a GUI that may be used to enable power monitoring for utilization tracking of a scientific instrument, in accordance with various embodiments.

In some embodiments, the provision of data representative of the operational state of the scientific instrument at 2406 may include providing summary statistics or other aggregate information representative of the operational state of the scientific instrument at one or more times. For example, FIG. 7 illustrates an example of a "Utilization Manager" GUI that includes utilization information for multiple different scientific instruments 1016 (indicated with the percentages "105%", "101%", etc. at the righthand side of the GUI). This utilization information may represent the amount of time that each of the associated scientific instruments is in the "Running" state relative to an expected or nominal amount of utilization. For example, if the scientific instrument 1016 represented by the ID DEMO 10007 is expected to be running for 8 hours a day (a parameter value that may be inserted and/or adjusted by a utilization technician), and the operational state data generated in accordance with the embodiments disclosed herein indicates that the scientific instrument 1016 has been running for 8.4 hours per day (or over a given time interval, such as the previous day, the previous week, etc.), the utilization reported in the "Utilization Manager" GUI of FIG. 7 may be 105%.

FIG. 10 illustrates an example of a "Tuning Console" GUI, which may be provided by the utilization logic 1006, that includes a plot of power consumption on the left, utilization tracking settings in the middle, and operational state information for an associated scientific instrument 1016 (i.e., the scientific instrument 1016 with Barcode 510111) on the right (including, for example, a pie chart or other indicator of the average percentage of time the associated scientific instrument 1016 in a particular operational state). In some embodiments, a utilization technician may use the GUI of FIG. 10 to manually adjust the utilization tracking settings otherwise generated by an automated procedure like the method 2300 of FIG. 5. In some embodiments, the "Tuning Console" GUI may be available to a utilization technician via a utilization management local computing device 1014, but may not be available to a user local computing device 1012. A utilization technician may alternately or additionally use the GUI of FIG. 10 to choose to apply the utilization tracking settings in the GUI to only the single scientific instrument 1016 whose information is currently shown in the GUI (e.g., by selecting the "Asset only" button in the "Apply threshold to:" box) or to all scientific instruments 1016 having the same asset profile as the particular scientific instrument 1016 whose information is currently shown in the GUI (e.g., by selecting the "Asset profile" button in the "Apply threshold to:" box). An asset profile may group all scientific instruments 1016 who are of the same type (e.g., mass spectrometer, centrifuge, refrigerator, etc.), are produced by the same manufacturer, or have any appropriate set of common characteristics.

Figure 11:
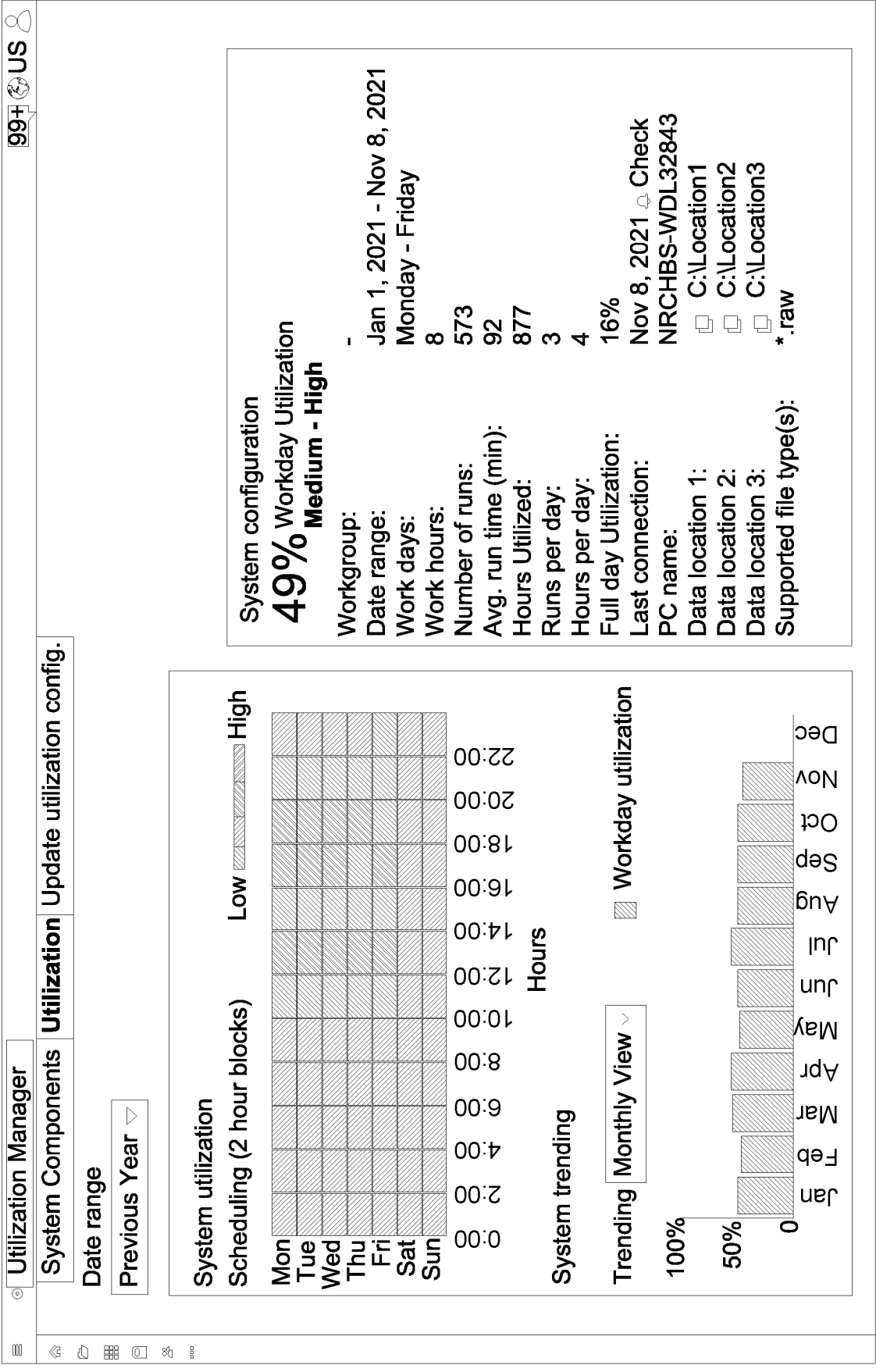
Figure 12:
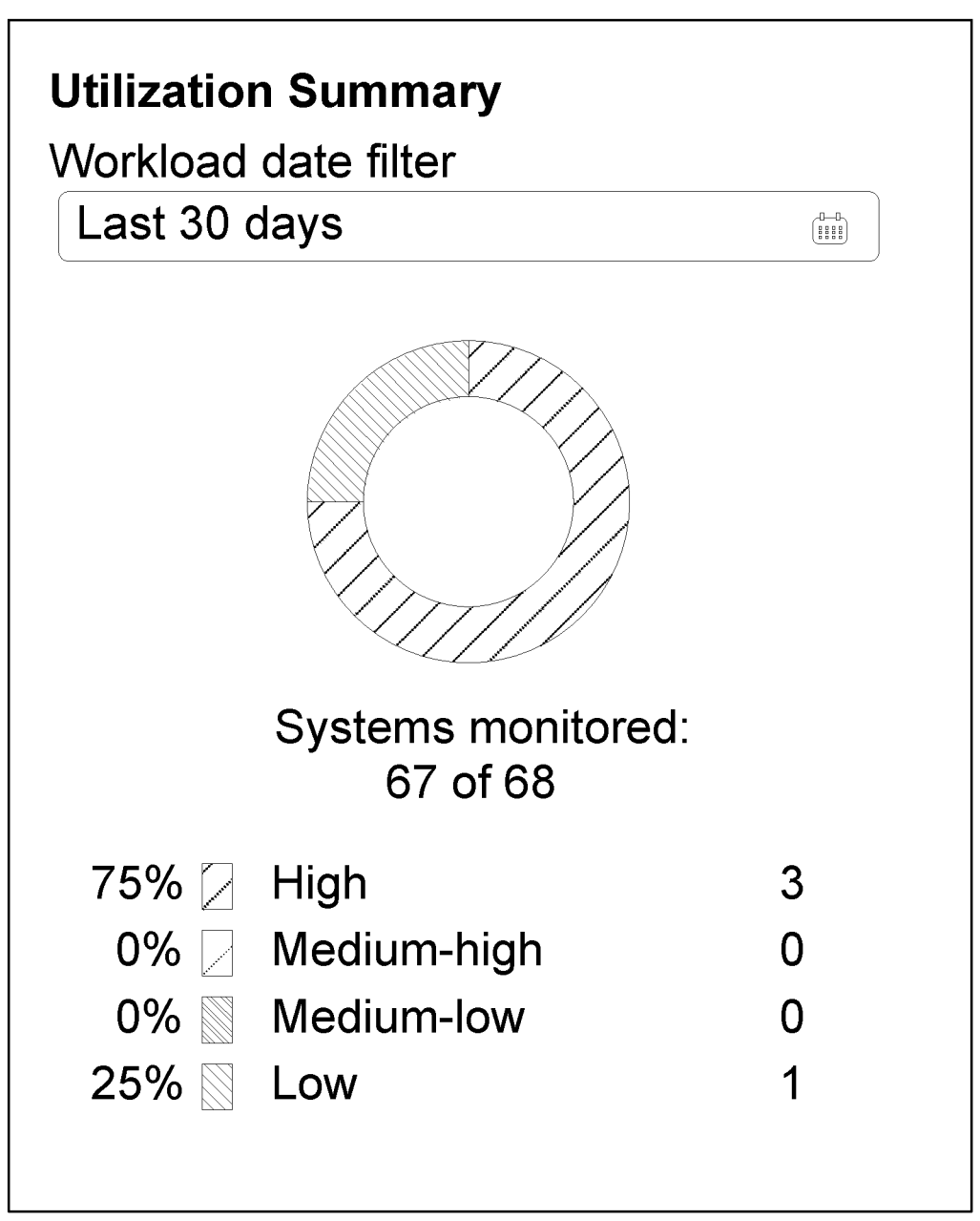

In some embodiments, a GUI may provide utilization about multiple scientific instruments 1016, in individual or aggregated form. For example, FIG. 7 is an example of a "Utilization Manager" GUI in which multiple scientific instruments 1016 and utilization percentages for each scientific instrument 1016 are provided. FIG. 11 is another example of a "Utilization Manager" GUI that may provide utilization information about one or more scientific instruments 1016. In particular, the GUI of FIG. 11 includes a heat map in the upper lefthand corner, indicating which days of the week and hours of the day have the greatest utilization for one or more scientific instruments 1016 (e.g., in a laboratory environment). Utilization percentages over time are presented in the plot in the lower lefthand corner, and the area on the right of the GUI provides more specific utilization information and details regarding where the underlying utilization data itself is stored. FIG. 12 is another example of an interface in a "Utilization Manager" GUI, showing a utilization summary over a selectable date range (e.g., "Last 30 days"), where utilization is categorized as "High," "Medium-High," "Medium-Low," and "Low"; each of these categories may be defined via the "Tuning Console" GUI or via the "Utilization Manager" GUI (e.g., by identifying a utilization percentage range of >75% as "High," a utilization percentage range of 50-75% as "Medium-High," etc.). The GUI of FIG. 12 also indicates the number of scientific instruments 1016 that are being power monitored for utilization purposes and how many scientific instruments 1016 in the laboratory or other setting are not being monitored (i.e., "4 of 68").

Figure 14:
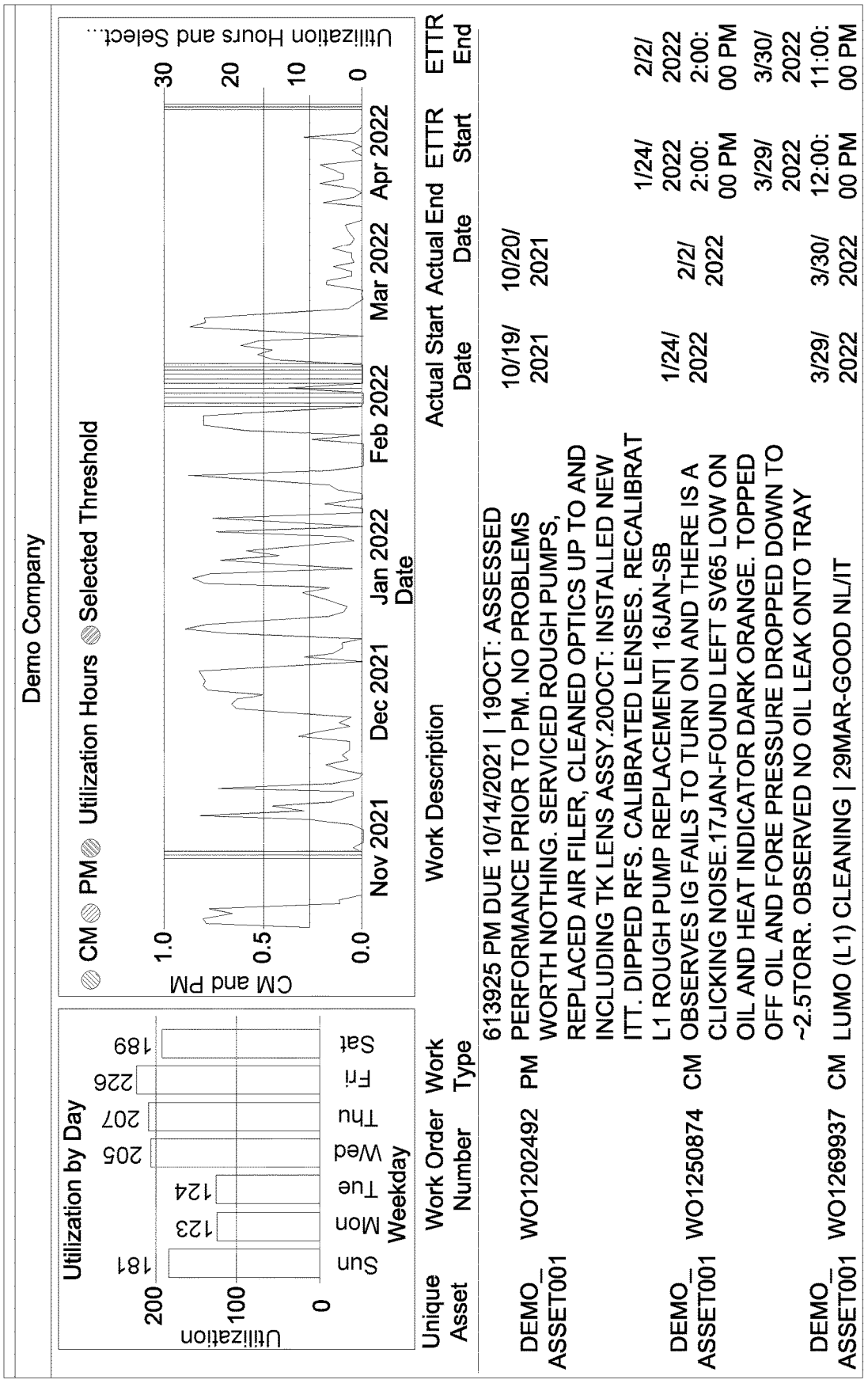
FIG. 14 is an example of a GUI that may be used to display utilization information and service information for a scientific instrument, in accordance with various embodiments.

FIG. 13 is another example of a "Utilization Manager" GUI in which multiple scientific instruments 1016 and utilization percentages for each are displayed, along with other statistics regarding usage of the scientific instruments 1016, in tabular form. In general, any of the embodiments of utilization analysis and reporting disclosed herein may be combined with other maintenance and utilization information. For example, FIG. 13 also illustrates the display of preventative maintenance (PM) information, corrective maintenance (CM) information, and estimated time to repair (ETTR) information. FIG. 14 is another example of a "Utilization Manager" GUI in which information regarding utilization of a scientific instrument 1016 is displayed (in bar graph form in the upper lefthand plot and in line graph form in the upper righthand plot) along with service information for the scientific instrument 1016 (e.g., a list of the most recent work orders associated with the scientific instrument 1016).

Figure 15:
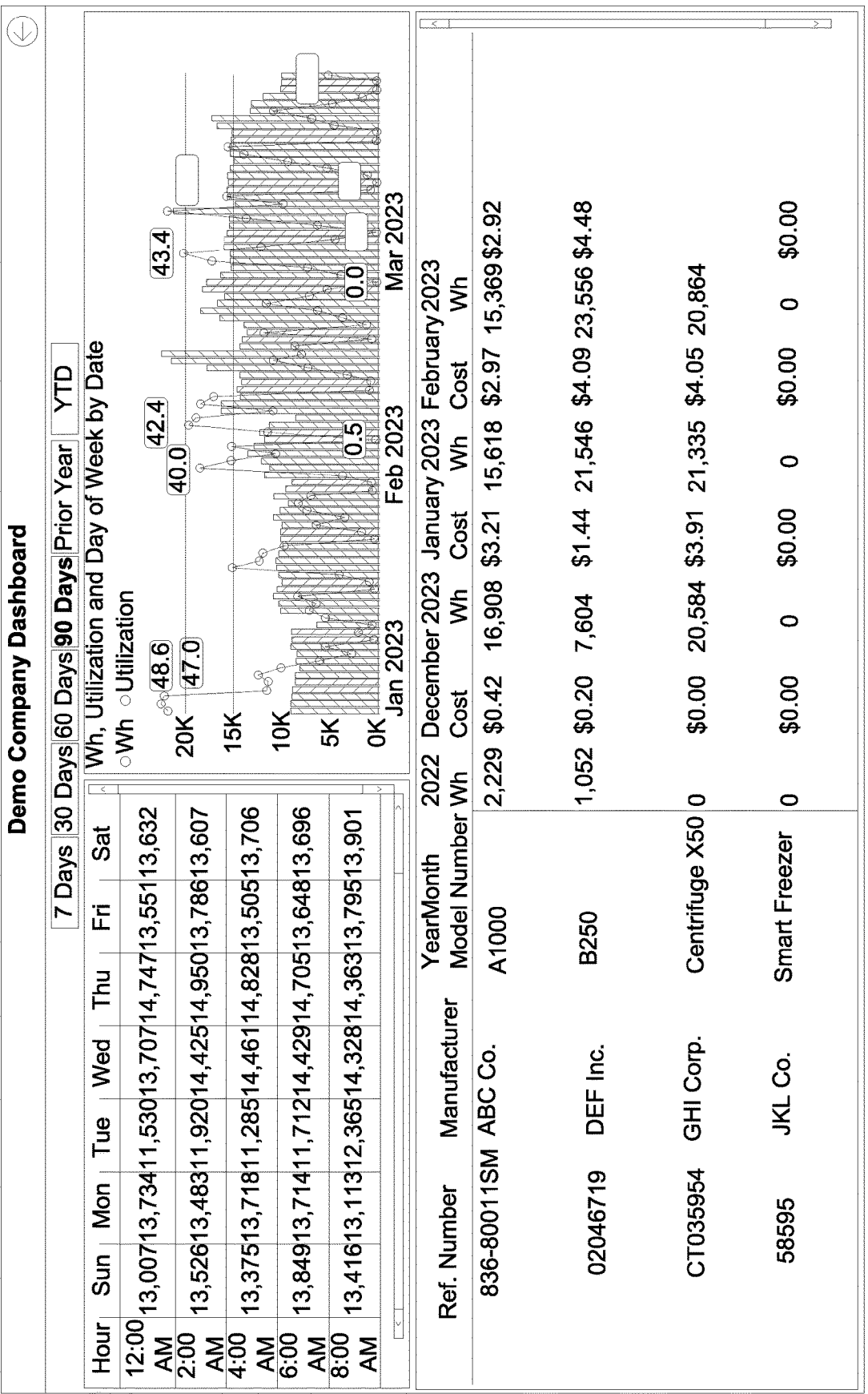
FIG. 15 is an example of a GUI that may be used to display utilization information and power consumption information for a scientific instrument, in accordance with various embodiments.

In some embodiments, a "Utilization Manager" GUI may include power consumption for one or more of the scientific instruments 1016. As used herein, "power consumption" may include an indication of power, energy, or another suitable power-related quantity. For example, FIG. 15 is an example of a Utilization Manager" GUI in which information regarding power consumption of a collection of scientific instrument 1016 (e.g., in kilowatt-hours (kWh) or another suitable unit) is displayed (in tabular form in the upper lefthand of the display and in line graph form in the upper righthand of the display), along with power consumption and cost information per month for the scientific instruments 1016 (in the table of the bottom half of the display). Presenting power consumption information may inform purchase decisions by a manager of a scientific laboratory (e.g., equipment from a first manufacturer may consistently use less power than the same equipment from a second manufacturer, and thus equipment from the first manufacturer may be preferable for achieving environmental sustainability goals), behavioral changes in the laboratory (e.g., seeing the amount and cost of power consumption may inform a decision to shut instruments down over evenings and the weekend, or vice versa).

Any of the user interface elements discussed herein with respect to any of the GUIs may be combined as suitable in a GUI provided by the scientific instrument utilization module 1000 to a service local computing device 1010, a user local computing device 1012, or a utilization management local computing device 1014. For example, any of the elements of the GUIs of FIGS. 11-15 may be combined and rearranged as suitable. More generally, the scientific instrument utilization tracking methods disclosed herein may include interactions with a human user (e.g., via any of the computing devices discussed with reference to FIG. 1, or the user local computing device 5020 discussed herein with reference to FIG. 18 below). These interactions may include providing information to the user (e.g., information regarding the operation of a scientific instrument such as the scientific instrument 1016 of FIG. 1 or the scientific instrument 5010 of FIG. 18, information regarding a sample being analyzed or other test or measurement performed by a scientific instrument, information retrieved from a local or remote database, or other information) or providing an option for a user to input commands (e.g., to control the operation of a scientific instrument such as the scientific instrument 1016 of FIG. 1 or the scientific instrument 5010 of FIG. 18, or to control the analysis of data generated by a scientific instrument), queries (e.g., to a local or remote database), or other information. In some embodiments, these interactions may be performed through GUI that includes a visual display on a display device (e.g., the display device 4010 discussed herein with reference to FIG. 17) that provides outputs to the user and/or prompts the user to provide inputs (e.g., via one or more input devices, such as a keyboard, mouse, trackpad, or touchscreen, included in the other I/O devices 4012 discussed herein with reference to FIG. 17). The scientific instrument utilization tracking systems disclosed herein may include any suitable GUIs for interaction with a user, such as any of the GUIs discussed above (e.g., with reference to FIGS. 7-14).

Figure 16:
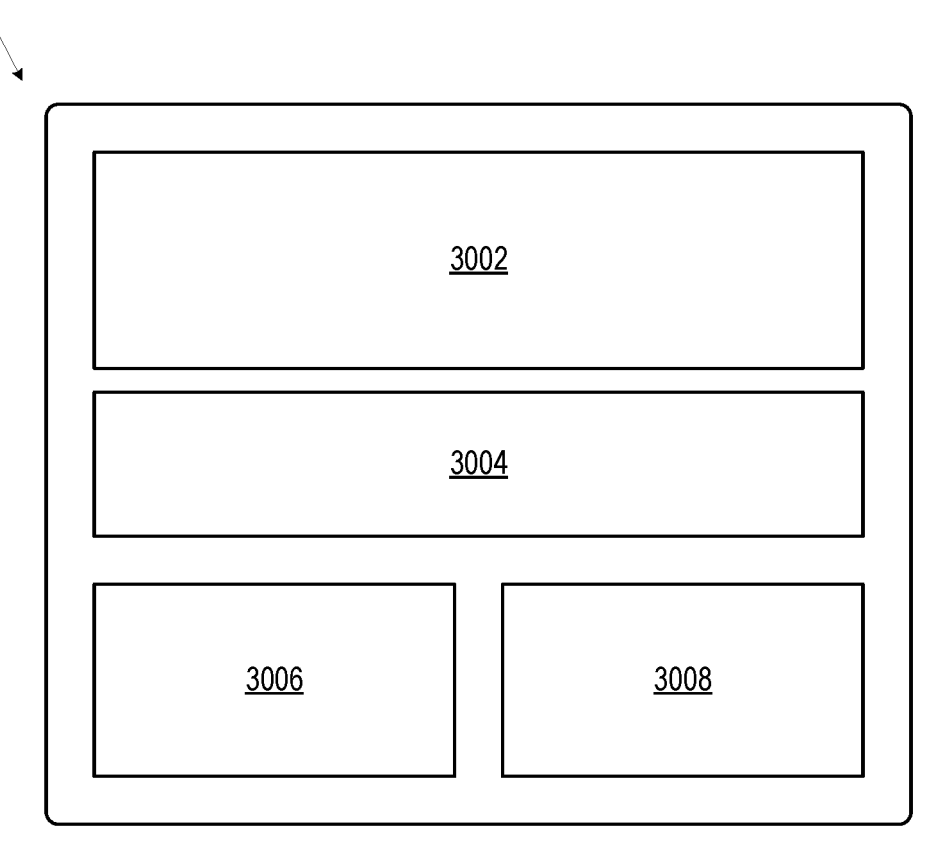
FIG. 16 is an example of a graphical user interface that may be used in the performance of some or all of the utilization tracking methods disclosed herein, in accordance with various embodiments.

FIG. 16 depicts an example GUI 3000 that may be used in the performance of some or all of the utilization tracking methods disclosed herein, in accordance with various embodiments. As noted above, the GUI 3000 may be provided on a display device (e.g., the display device 4010 discussed herein with reference to FIG. 17) of a computing device (e.g., the computing device 4000 discussed herein with reference to FIG. 17) of a scientific instrument utilization tracking system (e.g., the scientific instrument utilization tracking system 5000 discussed herein with reference to FIG. 18), and a user may interact with the GUI 3000 using any suitable input device (e.g., any of the input devices included in the other I/O devices 4012 discussed herein with reference to FIG. 17) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 16 is simply illustrative, and any number and arrangement of regions, including any desired features, may be included in a GUI 3000.

Figure 18:
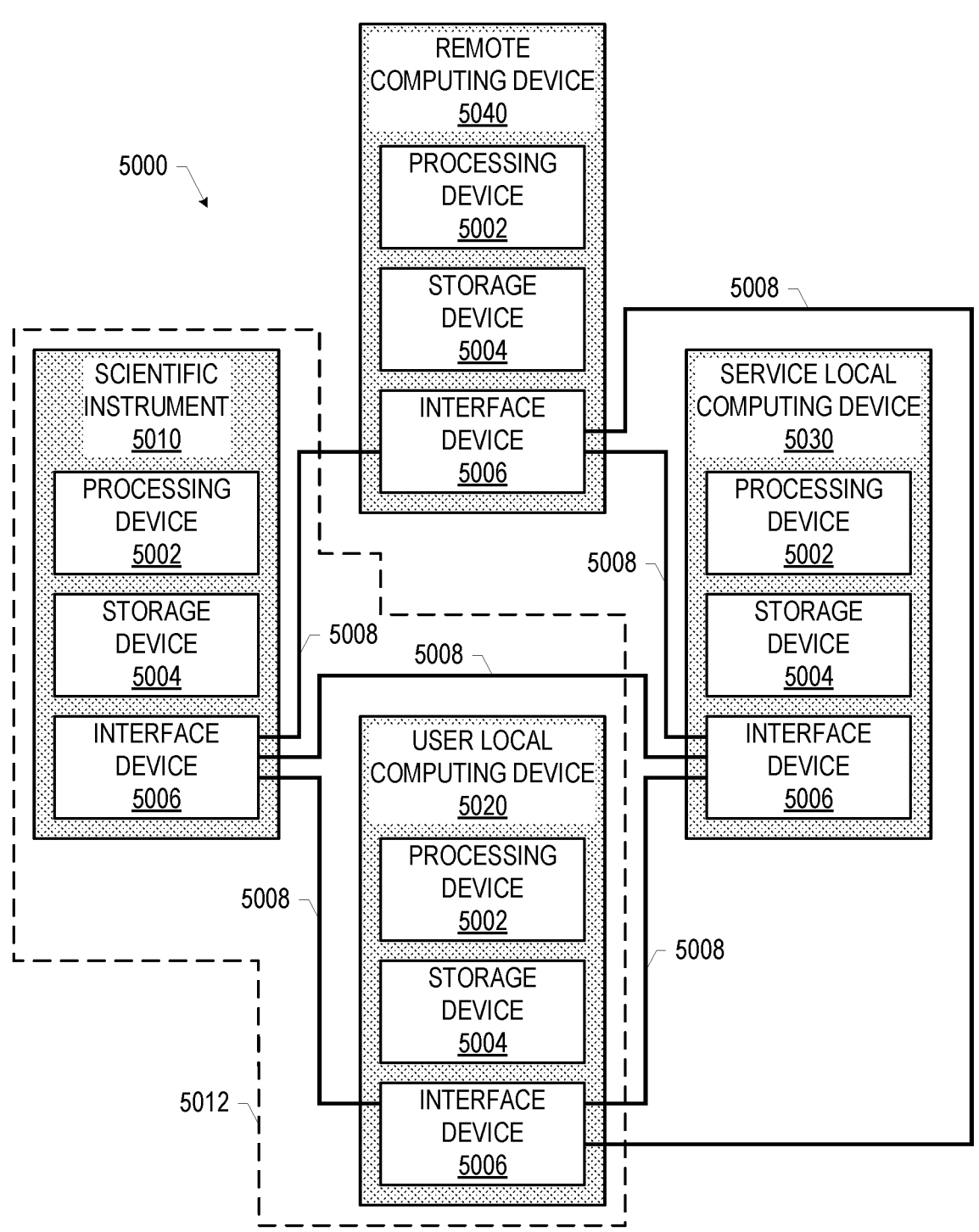
FIG. 18 is a block diagram of an example scientific instrument utilization tracking system in which some or all of the scientific instrument utilization tracking methods disclosed herein may be performed, in accordance with various embodiments.

The data display region 3002 may display data generated by a scientific instrument (e.g., the scientific instrument 5010 discussed herein with reference to FIG. 18).

The data analysis region 3004 may display the results of data analysis (e.g., the results of analyzing the data illustrated in the data display region 3002 and/or other data). In some embodiments, the data display region 3002 and the data analysis region 3004 may be combined in the GUI 3000 (e.g., to include data output from a scientific instrument, and some analysis of the data, in a common graph or region). For example, as discussed above, the data analysis region 3004 may include utilization information and/or power consumption information.

The scientific instrument control region 3006 may include options that allow the user to control a scientific instrument (e.g., the scientific instrument 5010 discussed herein with reference to FIG. 18).

Figure 17:
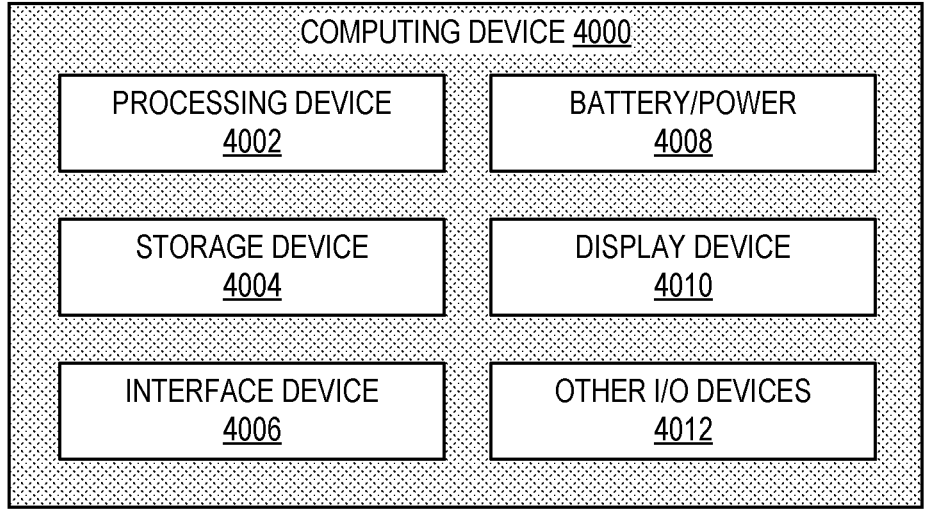
FIG. 17 is a block diagram of an example computing device that may perform some or all of the scientific instrument utilization tracking methods disclosed herein, in accordance with various embodiments.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 17, sending data to another user, labeling data, etc.).

As noted above, the scientific instrument utilization tracking module 1000 may be implemented by one or more computing devices, and the scientific instrument utilization tracking system 1050 may include one or more computing devices. FIG. 17 is a block diagram of a computing device 4000 that may perform some or all of the scientific instrument utilization tracking methods disclosed herein, in accordance with various embodiments. In some embodiments, the scientific instrument utilization tracking module 1000 and/or the scientific instrument utilization tracking system 1050 (or any parts thereof, such as the service local computing device 1010, the user local computing device 1012, or the utilization management local computing device 1014) may be implemented by a single computing device 4000 or by multiple computing devices 4000. Further, as discussed below, a computing device 4000 (or multiple computing devices 4000) that implements the scientific instrument utilization tracking module 1000 may be part of one or more of the scientific instrument 5010, the user local computing device 5020, the service local computing device 5030, or the remote computing device 5040 of FIG. 18.

The computing device 4000 of FIG. 17 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 17, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument utilization tracking modules or methods disclosed herein may be part of a scientific instrument utilization tracking system. FIG. 18 is a block diagram of an example scientific instrument utilization tracking system 5000 in which some or all of the scientific instrument utilization tracking methods disclosed herein may be performed, in accordance with various embodiments. The scientific instrument utilization tracking modules and methods disclosed herein (e.g., the scientific instrument utilization tracking module 1000 of FIG. 1 and the method 2000 of FIG. 2) may be implemented by one or more of the scientific instrument 5010, the user local computing device 5020, the service local computing device 5030, or the remote computing device 5040 of the scientific instrument utilization tracking system 5000.

Any of the scientific instrument 5010, the user local computing device 5020, the service local computing device 5030, or the remote computing device 5040 may include any of the embodiments of the computing device 4000 discussed herein with reference to FIG. 17, and any of the scientific instrument 5010, the user local computing device 5020, the service local computing device 5030, or the remote computing device 5040 may take the form of any appropriate ones of the embodiments of the computing device 4000 discussed herein with reference to FIG. 17.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 17, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 4004 discussed herein with reference to FIG. 17, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 17, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument utilization tracking system 5000 via communication pathways 5008. The communication pathways 5008 may communicatively couple the interface devices 5006 of different ones of the elements of the scientific instrument utilization tracking system 5000, as shown, and may be wired or wireless communication pathways (e.g., in accordance with any of the communication techniques discussed herein with reference to the interface devices 4006 of the computing device 4000 of FIG. 17). The particular scientific instrument utilization tracking system 5000 depicted in FIG. 18 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as any of the scientific instruments 1016 discussed herein or any other instrument used in a laboratory or scientific setting.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a data-center or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the scientific instrument utilization tracking system 5000 illustrated in FIG. 18 may not be present. Further, in some embodiments, multiple ones of various ones of the elements of the scientific instrument utilization tracking system 5000 of FIG. 18 may be present. For example, a scientific instrument utilization tracking system 5000 may include multiple user local computing devices 5020 (e.g., different user local computing devices 5020 associated with different users or in different locations). In another example, a scientific instrument utilization tracking system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a scientific instrument utilization tracking system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a scientific instrument utilization tracking system 5000 may be different types of scientific instruments 5010; for example, one scientific instrument 5010 may be a refrigeration system while another scientific instrument 5010 may be a spectrometer. In some such embodiments, the remote computing device 5040 and/or the user local computing device 5020 may combine data from different types of scientific instruments 5010 included in a scientific instrument utilization tracking system 5000.

The following paragraphs provide various examples of the embodiments disclosed herein.

Example A includes any of the scientific instrument utilization tracking modules disclosed herein.

Example B includes any of the methods disclosed herein.

Example C includes any of the GUIs disclosed herein.

Example D includes any of the scientific instrument utilization tracking computing devices and systems disclosed herein.

Example 1 is a method of tracking utilization of a scientific instrument, including: receiving, at a computing system, first data from a power sensor associated with the scientific instrument, wherein the power sensor monitors power consumption by the scientific instrument; generating, by the computing system based on the first data, multiple power consumption ranges associated with corresponding operational states of the scientific instrument; receiving, at the computing system, second data from the power sensor associated with the scientific instrument; and outputting, by the computing system, indications of the operational states over time of the scientific instrument based on the second data and the power consumption ranges.

Example 2 includes the subject matter of Example 1, and further specifies that the scientific instrument is not connected to a communications network, or the scientific instrument is not controlled by a separate personal computing device.

Example 3 includes the subject matter of any of Examples 1-2, and further specifies that the first data represents power consumption over at least one week of operation of the scientific instrument.

Example 4 includes the subject matter of any of Examples 1-3, and further specifies that the power sensor is an inline machine monitor.

Example 5 includes the subject matter of any of Examples 1-4, and further specifies that the power sensor communicates power consumption data wirelessly to a network device, and the network device communicates the power consumption data to the computing system.

Example 6 includes the subject matter of Example 5, and further specifies that the communication between the power sensor and the network device uses a wireless communication protocol different from a WiFi protocol.

Example 7 includes the subject matter of any of Examples 5-6, and further specifies that the communication between the power sensor and the network device is in accordance with a Wireless Personal Area Network (WPAN) protocol.

Example 8 includes the subject matter of any of Examples 5-7, and further specifies that the communication between the power sensor and the network device is in accordance with the IEEE Example 802. Example 15.4 wireless protocol.

Example 9 includes the subject matter of any of Examples 5-8, and further specifies that the network device is a gateway, and communicates the power consumption data to the computing system via a communication network local to the scientific instrument.

Example 10 includes the subject matter of Example 9, and further specifies that the computing system is remote from the scientific instrument.

Example 11 includes the subject matter of any of Examples 1-10, and further specifies that generating multiple power consumption ranges includes generating power consumption thresholds between different operational states.

Example 12 includes the subject matter of Example 11, and further specifies that generating power consumption thresholds includes iteratively adjusting power consumption thresholds based on a distribution of the first data relative to the power consumption thresholds.

Example 13 includes the subject matter of any of Examples 1-12, and further specifies that the operational states include off, idle, and running.

Example 14 includes the subject matter of any of Examples 1-13, and further specifies that the multiple power consumption ranges include at least two power consumption ranges.

Example 15 includes the subject matter of any of Examples 1-14, and further specifies that the multiple power consumption ranges include at least three power consumption ranges.

Example 16 includes the subject matter of any of Examples 1-15, and further specifies that outputting indications of the operational states of the scientific instrument includes providing a chart of the operational state of the scientific instrument versus time.

Example 17 includes the subject matter of any of Examples 1-16, and further specifies that outputting indications of the operational states of the scientific instrument includes providing a chart indicating percentages of time the scientific instrument has spent in different operational states.

Example 18 includes the subject matter of Example 17, and further specifies that the chart is a pie chart.

Example 19 includes the subject matter of any of Examples 1-18, and further specifies that outputting indications of the operational states of the scientific instrument includes providing a heat map of operational states of the scientific instrument over time.

Example 20 includes the subject matter of any of Examples 1-19, and further specifies that the scientific instrument is a first scientific instrument, the power sensor is a first power sensor, and the method further includes: receiving, at the computing system, third data from a second power sensor associated with a second scientific instrument different from the first scientific instrument, wherein the second power sensor monitors power consumption by the second scientific instrument; and outputting, by the computing system, indications of the operational states over time of the second scientific instrument based on the third data and the power consumption ranges.

Example 21 includes the subject matter of Example 20, and further specifies that the second scientific instrument is a same type of scientific instrument as the first scientific instrument.

Example 22 includes the subject matter of any of Examples 20-21, and further includes: before outputting indications of the operational states over time of the second scientific instrument based on the third data and the power consumption ranges, receiving, at the computing system, an instruction to use the power consumption ranges for determining utilization of the second scientific instrument.

Example 23 includes the subject matter of Example 22, and further specifies that the instruction is provided to the computing system through a graphical user interface.

Example 24 includes the subject matter of any of Examples 20-23, and further specifies that outputting indications of the operational states over time of the first scientific instrument and second scientific instrument includes indicating an average percentage of time the first scientific instrument and the second scientific instrument are in a particular operational state.

Example 25 includes the subject matter of Example 24, and further specifies that the particular operational state is a running state.

Example 26 includes the subject matter of any of Examples 1-19, and further specifies that the scientific instrument is a first scientific instrument, the power sensor is a first power sensor, the power consumption ranges are first power consumption ranges, and the method further includes: receiving, at the computing system, third data from a second power sensor associated with a second scientific instrument different from the first scientific instrument, wherein the second power sensor monitors power consumption by the second scientific instrument; generating, by the computing system based on the third data, multiple second power consumption ranges associated with corresponding operational states of the second scientific instrument, wherein the second power consumption ranges are different from the first power consumption ranges; receiving, at the computing system, fourth data from the second power sensor associated with the second scientific instrument; and outputting, by the computing system, indications of the operational states over time of the second scientific instrument based on the fourth data and the second power consumption ranges.

Example 27 includes the subject matter of Example 26, and further specifies that the second scientific instrument is a same type of scientific instrument as the first scientific instrument.

Example 28 includes the subject matter of Example 26, and further specifies that the second scientific instrument is a different type of scientific instrument than the first scientific instrument.

Example 29 includes the subject matter of any of Examples 26-28, and further specifies that outputting indications of the operational states of the first scientific instrument and second scientific instrument includes indicating an average percentage of time the first scientific instrument and the second scientific instrument are in a particular operational state.

Example 30 includes the subject matter of Example 29, and further specifies that the particular operational state is a running state.

Example 31 includes the subject matter of any of Examples 1-19, and further specifies that the scientific instrument is a first scientific instrument, and the method further includes: receiving, at the computing system, data representative of operational states over time of a second scientific instrument different from the first scientific instrument, wherein the data is generated based on software installed on or communicating with the second scientific instrument; and outputting, by the computing system, indications of the operational states of the second scientific instrument.

Example 32 includes the subject matter of Example 31, and further specifies that the second scientific instrument is a same type of scientific instrument as the first scientific instrument.

Example 33 includes the subject matter of Example 31, and further specifies that the second scientific instrument is a different type of scientific instrument than the first scientific instrument.

Example 34 includes the subject matter of any of Examples 31-33, and further specifies that outputting indications of the operational states of the first scientific instrument and second scientific instrument includes indicating that the operational states of the first scientific instrument were determined by power monitoring and the operational states of the second scientific instrument were determined by software monitoring.

Example 35 includes the subject matter of any of Examples 1-34, and further includes: outputting, by the computing system, indications of service requests or service work associated with the scientific instrument.

Example 36 includes the subject matter of Example 35, and further specifies that the indications of service requests or service work associated with the scientific instrument are to be displayed concurrently with the indications of the operational states over time of the scientific instrument.

Example 37 is a system for tracking utilization of a scientific instrument, including: a power sensor to monitor power consumption of the scientific instrument; and a computing system, configured to receive power consumption data from the power sensor, to generate operational state power consumption thresholds that associate different power consumptions with different operational states of the scientific instrument, and to output indications of the operational states over time of the scientific instrument based on the received power consumption data and the operational state power consumption thresholds.

Example 38 includes the subject matter of Example 37, and further specifies that the scientific instrument is not connected to a communications network, or the scientific instrument is not controlled by a separate personal computing device.

Example 39 includes the subject matter of any of Examples 37-38, and further specifies that generating operational state power consumption thresholds uses at least one week of power consumption data for the scientific instrument.

Example 40 includes the subject matter of any of Examples 37-39, and further specifies that the power sensor is an inline machine monitor.

Example 41 includes the subject matter of any of Examples 37-40, and further specifies that the power sensor communicates power consumption data wirelessly to a network device, and the network device communicates the power consumption data to the computing system.

Example 42 includes the subject matter of Example 41, and further specifies that the communication between the power sensor and the network device uses a wireless communication protocol different from a WiFi protocol.

Example 43 includes the subject matter of any of Examples 41-42, and further specifies that the communication between the power sensor and the network device is in accordance with a Wireless Personal Area Network (WPAN) protocol.

Example 44 includes the subject matter of any of Examples 41-43, and further specifies that the communication between the power sensor and the network device is in accordance with the IEEE Example 802. Example 15.4 wireless protocol.

Example 45 includes the subject matter of any of Examples 41-44, and further specifies that the network device is a gateway, and communicates the power consumption data to the computing system via a communication network local to the scientific instrument.

Example 46 includes the subject matter of Example 45, and further specifies that the computing system is remote from the scientific instrument.

Example 47 includes the subject matter of any of Examples 41-46, and further includes: the network device.

Example 48 includes the subject matter of any of Examples 37-47, and further specifies that generating operational state power consumption thresholds includes iteratively adjusting power consumption thresholds based on a distribution of the power consumption data relative to the power consumption thresholds.

Example 49 includes the subject matter of any of Examples 37-48, and further specifies that the operational states include off, idle, and running.

Example 50 includes the subject matter of any of Examples 37-49, and further specifies that the operational states include at least two operational states.

Example 51 includes the subject matter of any of Examples 37-50, and further specifies that the operational states include at least three operational states.

Example 52 includes the subject matter of any of Examples 37-51, and further specifies that outputting indications of the operational states of the scientific instrument includes providing a chart of the operational state of the scientific instrument versus time.

Example 53 includes the subject matter of any of Examples 37-52, and further specifies that outputting indications of the operational states of the scientific instrument includes providing a chart indicating percentages of time the scientific instrument has spent in different operational states.

Example 54 includes the subject matter of Example 53, and further specifies that the chart is a pie chart.

Example 55 includes the subject matter of any of Examples 37-54, and further specifies that outputting indications of the operational states of the scientific instrument includes providing a heat map of operational states of the scientific instrument over time.

Example 56 includes the subject matter of any of Examples 37-55, and further specifies that the scientific instrument is a first scientific instrument, the power sensor is a first power sensor, and the system further includes: a second power sensor to monitor power consumption of a second scientific instrument different from the first scientific instrument; wherein the computing system is configured to receive power consumption data from the second power sensor and to output indications of the operational states over time of the second scientific instrument based on the received power consumption data for the second scientific instrument and the operational state power consumption thresholds.

Example 57 includes the subject matter of Example 56, and further specifies that the second scientific instrument is a same type of scientific instrument as the first scientific instrument.

Example 58 includes the subject matter of any of Examples 56-57, and further specifies that the computing system is to, before outputting indications of the operational states over time of the second scientific instrument based on the power consumption data for the second scientific instrument and the operational state power consumption thresholds, receive an instruction to use the operational state power consumption thresholds for determining utilization of the second scientific instrument.

Example 59 includes the subject matter of Example 58, and further specifies that the instruction is provided to the computing system through a graphical user interface.

Example 60 includes the subject matter of any of Examples 56-59, and further specifies that outputting indications of the operational states over time of the first scientific instrument and second scientific instrument includes indicating an average percentage of time the first scientific instrument and the second scientific instrument are in a particular operational state.

Example 61 includes the subject matter of Example 60, and further specifies that the particular operational state is a running state.

Example 62 includes the subject matter of any of Examples 37-55, and further specifies that the scientific instrument is a first scientific instrument, the power sensor is a first power sensor, the operational state power consumption thresholds are first operational state power consumption thresholds, and the system further includes: a second power sensor associated with a second scientific instrument different from the first scientific instrument, wherein the second power sensor monitors power consumption by the second scientific instrument; wherein the computing system is configured to receive power consumption data from the second power sensor, to generate second operational state power consumption thresholds that associate different power consumptions with different operational states of the second scientific instrument, and to output indications of the operational states over time of the second scientific instrument based on the received power consumption data and the second operational state power consumption thresholds.

Example 63 includes the subject matter of Example 62, and further specifies that the second scientific instrument is a same type of scientific instrument as the first scientific instrument.

Example 64 includes the subject matter of Example 62, and further specifies that the second scientific instrument is a different type of scientific instrument than the first scientific instrument.

Example 65 includes the subject matter of any of Examples 62-64, and further specifies that outputting indications of the operational states of the first scientific instrument and second scientific instrument includes indicating an average percentage of time the first scientific instrument and the second scientific instrument are in a particular operational state.

Example 66 includes the subject matter of Example 65, and further specifies that the particular operational state is a running state.

Example 67 includes the subject matter of any of Examples 37-55, and further specifies that the scientific instrument is a first scientific instrument, and the computing system is further to receive data representative of operational states over time of a second scientific instrument different from the first scientific instrument, wherein the data is generated based on software installed on or communicating with the second scientific instrument, and output indications of the operational states of the second scientific instrument.

Example 68 includes the subject matter of Example 67, and further specifies that the second scientific instrument is a same type of scientific instrument as the first scientific instrument.

Example 69 includes the subject matter of Example 67, and further specifies that the second scientific instrument is a different type of scientific instrument than the first scientific instrument.

Example 70 includes the subject matter of any of Examples 67-69, and further specifies that outputting indications of the operational states of the first scientific instrument and second scientific instrument includes indicating that the operational states of the first scientific instrument were determined by power monitoring and the operational states of the second scientific instrument were determined by software monitoring.

Example 71 includes the subject matter of any of Examples 37-70, and further specifies that the computing system is further to output indications of service requests or service work associated with the scientific instrument.

Example 72 includes the subject matter of Example 71, and further specifies that the indications of service requests or service work associated with the scientific instrument are to be displayed concurrently with the indications of the operational states over time of the scientific instrument.

Example 73 is a method of tracking utilization of a scientific instrument, including: receiving, at a computing system, first data indicative of power consumption by the scientific instrument; generating, by the computing system based on the first data, multiple power consumption ranges associated with corresponding operational states of the scientific instrument; providing, by the computing system, a user option to change the power consumption ranges associated with corresponding operational states of the scientific instrument; receiving, at the computing system, second data indicative of power consumption by the scientific instrument; and outputting, by the computing system, indications of the operational states over time of the scientific instrument based on the second data and the power consumption ranges.

Example 74 includes the subject matter of Example 73, and further specifies that the scientific instrument is not connected to a communications network, or the scientific instrument is not controlled by a separate personal computing device.

Example 75 includes the subject matter of any of Examples 73-74, and further specifies that the first data represents power consumption over at least one week of operation of the scientific instrument.

Example 76 includes the subject matter of any of Examples 73-75, and further specifies that the first data is generated by a power sensor, and the power sensor is an inline machine monitor.

Example 77 includes the subject matter of Example 76, and further specifies that the power sensor communicates power consumption data wirelessly to a network device, and the network device communicates the power consumption data to the computing system.

Example 78 includes the subject matter of Example 77, and further specifies that the communication between the power sensor and the network device uses a wireless communication protocol different from a WiFi protocol.

Example 79 includes the subject matter of any of Examples 77-78, and further specifies that the communication between the power sensor and the network device is in accordance with a Wireless Personal Area Network (WPAN) protocol.

Example 80 includes the subject matter of any of Examples 77-79, and further specifies that the communication between the power sensor and the network device is in accordance with the IEEE Example 802. Example 15.4 wireless protocol.

Example 81 includes the subject matter of any of Examples 77-80, and further specifies that the network device is a gateway, and communicates the power consumption data to the computing system via a communication network local to the scientific instrument.

Example 82 includes the subject matter of any of Examples 81, and further specifies that the computing system is remote from the scientific instrument.

Example 83 includes the subject matter of any of Examples 73-82, and further specifies that generating multiple power consumption ranges includes generating power consumption thresholds between different operational states.

Example 84 includes the subject matter of any of Examples 83, and further specifies that generating power consumption thresholds includes iteratively adjusting power consumption thresholds based on a distribution of the first data relative to the power consumption thresholds.

Example 85 includes the subject matter of any of Examples 73-84, and further specifies that the operational states include off, idle, and running.

Example 86 includes the subject matter of any of Examples 73-85, and further specifies that the multiple power consumption ranges include at least two power consumption ranges.

Example 87 includes the subject matter of any of Examples 73-86, and further specifies that the multiple power consumption ranges include at least three power consumption ranges.

Example 88 includes the subject matter of any of Examples 73-87, and further specifies that outputting indications of the operational states of the scientific instrument includes providing a chart of the operational state of the scientific instrument versus time.

Example 89 includes the subject matter of any of Examples 73-88, and further specifies that outputting indications of the operational states of the scientific instrument includes providing a chart indicating percentages of time the scientific instrument has spent in different operational states.

Example 90 includes the subject matter of any of Examples 89, and further specifies that the chart is a pie chart.

Example 91 includes the subject matter of any of Examples 73-90, and further specifies that outputting indications of the operational states of the scientific instrument includes providing a heat map of operational states of the scientific instrument over time.

Example 92 includes the subject matter of any of Examples 73-91, and further specifies that the scientific instrument is a first scientific instrument and the method further includes: receiving, at the computing system, third data indicative of power consumption by a second scientific instrument; and outputting, by the computing system, indications of the operational states over time of the second scientific instrument based on the third data and the power consumption ranges.

Example 93 includes the subject matter of Example 92, and further specifies that the second scientific instrument is a same type of scientific instrument as the first scientific instrument.

Example 94 includes the subject matter of any of Examples 92-93, and further includes: before outputting indications of the operational states over time of the second scientific instrument based on the third data and the power consumption ranges, receiving, at the computing system, an instruction to use the power consumption ranges for determining utilization of the second scientific instrument.

Example 95 includes the subject matter of Example 94, and further specifies that the instruction is provided to the computing system through a graphical user interface.

Example 96 includes the subject matter of any of Examples 92-95, and further specifies that outputting indications of the operational states over time of the first scientific instrument and second scientific instrument includes indicating an average percentage of time the first scientific instrument and the second scientific instrument are in a particular operational state.

Example 97 includes the subject matter of Example 96, and further specifies that the particular operational state is a running state.

Example 98 includes the subject matter of any of Examples 73-91, and further specifies that the scientific instrument is a first scientific instrument, the power consumption ranges are first power consumption ranges, and the method further includes: receiving, at the computing system, third data indicative of power consumption by a second scientific instrument; generating, by the computing system based on the third data, multiple second power consumption ranges associated with corresponding operational states of the second scientific instrument, wherein the second power consumption ranges are different from the first power consumption ranges; providing, by the computing system, a user option to change the power consumption ranges associated with corresponding operational states of the second scientific instrument; receiving, at the computing system, fourth data indicative of power consumption by the second scientific instrument; and outputting, by the computing system, indications of the operational states over time of the second scientific instrument based on the fourth data and the second power consumption ranges.

Example 99 includes the subject matter of Example 98, and further specifies that the second scientific instrument is a same type of scientific instrument as the first scientific instrument.

Example 100 includes the subject matter of Example 98, and further specifies that the second scientific instrument is a different type of scientific instrument than the first scientific instrument.

Example 101 includes the subject matter of any of Examples 98-100, and further specifies that outputting indications of the operational states of the first scientific instrument and second scientific instrument includes indicating an average percentage of time the first scientific instrument and the second scientific instrument are in a particular operational state.

Example 102 includes the subject matter of Example 101, and further specifies that the particular operational state is a running state.

Example 103 includes the subject matter of any of Examples 73-91, and further specifies that the scientific instrument is a first scientific instrument, and the method further includes: receiving, at the computing system, data representative of operational states over time of a second scientific instrument different from the first scientific instrument, wherein the data is generated based on software installed on or communicating with the second scientific instrument; and outputting, by the computing system, indications of the operational states of the second scientific instrument.

Example 104 includes the subject matter of Example 103, and further specifies that the second scientific instrument is a same type of scientific instrument as the first scientific instrument.

Example 105 includes the subject matter of Example 103, and further specifies that the second scientific instrument is a different type of scientific instrument than the first scientific instrument.

Example 106 includes the subject matter of any of Examples 103-105, and further specifies that outputting indications of the operational states of the first scientific instrument and second scientific instrument includes indicating that the operational states of the first scientific instrument were determined by power monitoring and the operational states of the second scientific instrument were determined by software monitoring.

Example 107 includes the subject matter of any of Examples 73-106, and further includes: outputting, by the computing system, indications of service requests or service work associated with the scientific instrument.

Example 108 includes the subject matter of Example 107, and further specifies that the indications of service requests or service work associated with the scientific instrument are to be displayed concurrently with the indications of the operational states over time of the scientific instrument.

Example 109 includes the subject matter of any of Examples 73-108, and further specifies that providing a user option to change the power consumption ranges associated with corresponding operational states of the scientific instrument includes providing user-adjustable fields in a graphical user interface.

Example 110 includes the subject matter of any of Examples 73-109, and further includes: providing, by the computing system, a user option to change one or more parameters of power consumption range generation process.

Example 111 includes the subject matter of Example 110, and further specifies that the one or more parameters include minimum runtime.

Example 112 includes the subject matter of any of Examples 110-111, and further specifies that the one or more parameters include running tolerance.

Example 113 is one or more computer-readable media having instructions thereon that, when executed by one or more processing devices of a computing system, cause the computing system to perform the method of any of Examples 1-36 or 73-112.

Example 114 is an apparatus comprising means for performing the method of any of Examples 1-36 or 73-112.

The invention claimed is:

1. A method of tracking utilization of a scientific instrument, comprising:

receiving, at a computing system, first data from a power sensor associated with the scientific instrument, wherein the power sensor monitors power consumption by the scientific instrument;

generating, by the computing system based on the first data, multiple power consumption ranges associated with corresponding operational states of the scientific instrument;

receiving, at the computing system, second data from the power sensor associated with the scientific instrument;

outputting, by the computing system, indications of the operational states over time of the scientific instrument based on the second data and the power consumption ranges, wherein the operational states are determined based on a comparison of the second data and the power consumption ranges.

2. The method of claim 1, wherein generating multiple power consumption ranges includes generating power consumption thresholds between different operational states.

3. The method of claim 2, wherein generating power consumption thresholds includes iteratively adjusting power consumption thresholds based on a distribution of the first data relative to the power consumption thresholds.

4. The method of claim 1, wherein the scientific instrument is a first scientific instrument, the power sensor is a first power sensor, the power consumption ranges are first power consumption ranges, and the method further includes:

receiving, at the computing system, third data from a second power sensor associated with a second scientific instrument different from the first scientific instrument, wherein the second power sensor monitors power consumption by the second scientific instrument;

generating, by the computing system based on the third data, multiple second power consumption ranges associated with corresponding operational states of the second scientific instrument, wherein the second power consumption ranges are different from the first power consumption ranges;

receiving, at the computing system, fourth data from the second power sensor associated with the second scientific instrument; and outputting, by the computing system, indications of the operational states over time of the second scientific instrument based on the fourth data and the second power consumption ranges.

5. The method of claim 1, wherein the scientific instrument is a first scientific instrument, and the method further includes:

receiving, at the computing system, data representative of operational states over time of a second scientific instrument different from the first scientific instrument, wherein the data is generated based on software installed on or communicating with the second scientific instrument; and outputting, by the computing system, indications of the operational states of the second scientific instrument.

6. A system for tracking utilization of a scientific instrument, comprising:

a power sensor to monitor power consumption of the scientific instrument; and a computing system, configured to receive power consumption data from the power sensor, to generate operational state power consumption thresholds that associate different power consumptions with different operational states of the scientific instrument, and to output indications of the operational states over time of the scientific instrument based on the received power consumption data and the operational state power consumption thresholds, wherein the operational states are determined based on a comparison of the received power consumption data and the operational state power consumption thresholds.

7. The system of claim 6, wherein the scientific instrument is not connected to a communications network, or the scientific instrument is not controlled by a separate personal computing device.

8. The system of claim 6, wherein the power sensor is an inline machine monitor.

9. The system of claim 6, wherein the power sensor communicates power consumption data wirelessly to a network device, and the network device communicates the power consumption data to the computing system.

10. The system of claim 6, wherein the scientific instrument is a first scientific instrument, the power sensor is a first power sensor, the operational state power consumption thresholds are first operational state power consumption thresholds, and the system further includes:

a second power sensor associated with a second scientific instrument different from the first scientific instrument, wherein the second power sensor monitors power consumption by the second scientific instrument;

wherein the computing system is configured to receive power consumption data from the second power sensor, to generate second operational state power consumption thresholds that associate different power consumptions with different operational states of the second scientific instrument, and to output indications of the operational states over time of the second scientific instrument based on the received power consumption data and the second operational state power consumption thresholds.

11. The system of claim 6, wherein the computing system is further to output indications of service requests or service work associated with the scientific instrument.

12. The system of claim 11, wherein the indications of service requests or service work associated with the scientific instrument are to be displayed concurrently with the indications of the operational states over time of the scientific instrument.

13. A method of tracking utilization of a scientific instrument, comprising:

receiving, at a computing system, first data indicative of power consumption by the scientific instrument;

generating, by the computing system based on the first data, multiple power consumption ranges associated with corresponding operational states of the scientific instrument;

providing, by the computing system, a user option to change the power consumption ranges associated with corresponding operational states of the scientific instrument;

receiving, at the computing system, second data indicative of power consumption by the scientific instrument; and outputting, by the computing system, indications of the operational states over time of the scientific instrument based on the second data and the power consumption ranges, wherein the operational states are determined based on a comparison of the second data and the power consumption ranges.

14. The method of any of claim 13, wherein providing a user option to change the power consumption ranges associated with corresponding operational states of the scientific instrument includes providing user-adjustable fields in a graphical user interface.

15. The method of claim 13, further comprising:

providing, by the computing system, a user option to change one or more parameters of power consumption range generation process.

16. The method of claim 15, wherein the one or more parameters include minimum runtime.

17. The method of claim 15, wherein the one or more parameters include running tolerance.

18. A method of tracking utilization of a scientific instrument, comprising:

receiving, at a computing system, first data from a power sensor associated with the scientific instrument, wherein the power sensor monitors power consumption by the scientific instrument;

generating, by the computing system based on the first data, multiple power consumption ranges associated with corresponding operational states of the scientific instrument;

receiving, at the computing system, second data from the power sensor associated with the scientific instrument;

outputting, by the computing system, indications of the operational states over time of the scientific instrument based on the second data and the power consumption ranges, wherein the scientific instrument is a first scientific instrument, the power sensor is a first power sensor, and the method further includes:

receiving, at the computing system, third data from a second power sensor associated with a second scientific instrument different from the first scientific instrument, wherein the second power sensor monitors power consumption by the second scientific instrument; and outputting, by the computing system, indications of the operational states over time of the second scientific instrument based on the third data and the power consumption ranges.

19. The method of claim 18, wherein the second scientific instrument is a same type of scientific instrument as the first scientific instrument.

20. The method of claim 18, further comprising:

before outputting indications of the operational states over time of the second scientific instrument based on the third data and the power consumption ranges, receiving, at the computing system, an instruction to use the power consumption ranges for determining utilization of the second scientific instrument.

* * * * *